US011076306B2

(12) United States Patent
Hampel et al.

(10) Patent No.: US 11,076,306 B2
(45) Date of Patent: Jul. 27, 2021

(54) RELAY NODES WITH MULTI-CONNECTED CELLULAR BACKHAUL

(71) Applicant: QUALCOMM Incorporated, San Diego, CA (US)

(72) Inventors: Karl Georg Hampel, Hoboken, NJ (US); Navid Abedini, Somerset, NJ (US); Muhammad Nazmul Islam, Littleton, MA (US); Jianghong Luo, Skillman, NJ (US); Junyi Li, Chester, NJ (US); Tao Luo, San Diego, CA (US); Hong Cheng, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/572,219

(22) Filed: Sep. 16, 2019

(65) Prior Publication Data

US 2020/0100124 A1    Mar. 26, 2020

Related U.S. Application Data

(60) Provisional application No. 62/734,947, filed on Sep. 21, 2018.

(51) Int. Cl.
*H04W 24/04* (2009.01)
*H04W 24/10* (2009.01)
(Continued)

(52) U.S. Cl.
CPC ........... *H04W 24/04* (2013.01); *H04W 24/10* (2013.01); *H04W 84/047* (2013.01); *H04W 88/085* (2013.01)

(58) Field of Classification Search
CPC ... H04W 24/04; H04W 24/10; H04W 84/047; H04W 88/085
(Continued)

(56) References Cited

U.S. PATENT DOCUMENTS 8,755,324 B2 * 6/2014 Yu ..................... H04W 72/085
370/315
10,237,759 B1 * 3/2019 Marupaduga ......... H04L 5/0057
(Continued)

OTHER PUBLICATIONS

3rd Generation Partnership Project; Technical Specification Group Radio Access Network; Study on Integrated Access and Backhaul; (Release 15), 3GPP Draft; TR 38874 V040-TR, 3rd Generation Partnership Project (3GPP), Mobile Competence Centre; 650, Route Des Lucioles; F-06921 Sophia-Antipolis Cedex; France, Aug. 9, 2018, XP051521678, 55 Pages, Retrieved from the Internet: URL: http://www.3gpp.org/ftp/tsg%5Fran/WG2%5FRL2/TSGR2%5F103/Docs/R2%2D1812054%2Ezip [retrieved on Aug. 9, 2018] paragraphs [06.1], [07.2], [07.3], [6.1.1], [8.2.2].
(Continued)

*Primary Examiner* — Mong-Thuy T Tran
(74) *Attorney, Agent, or Firm* — Holland & Hart LLP/QUALCOMM Incorporated

(57) ABSTRACT

A network management function of a relay network may identify relay node support of multi-mobile terminal (MT) operation, and may coordinate configuration of multiple backhaul links supported by the relay node via the multi-MT functionality of the relay node. In some cases, a relay node may transmit MT capabilities to the management function over a first established backhaul link, and the management function may configure a second backhaul link using a second MT function of the relay node. In other cases, the relay node may autonomously establish multi-MT connectivity based on preconfigured parent-selection policies, and the network management function may identify the relay (Continued)

node is dual-connected to the network management function. In either case, the network management function may configure backhaul routes (e.g., backhaul links) and resource configuration across the redundant topology.

30 Claims, 20 Drawing Sheets

(51) Int. Cl.
*H04W 84/04* (2009.01)
*H04W 88/08* (2009.01)

(58) Field of Classification Search
USPC .......................................................... 455/449
See application file for complete search history.

(56) References Cited

U.S. PATENT DOCUMENTS

| | | | | |
|---|---|---|---|---|
| 2009/0029645 | A1* | 1/2009 | Leroudier | H04W 84/047 455/7 |
| 2011/0194483 | A1* | 8/2011 | Ji | H04W 36/0033 370/315 |
| 2011/0244851 | A1* | 10/2011 | Gunnarsson | H04B 7/14 455/423 |
| 2012/0184204 | A1* | 7/2012 | Kazmi | H04B 7/15542 455/7 |
| 2014/0064158 | A1* | 3/2014 | Timus | H04W 36/30 370/279 |
| 2015/0131618 | A1* | 5/2015 | Chen | H04W 16/02 370/332 |
| 2016/0277209 | A1* | 9/2016 | Leiba | H04L 12/437 |
| 2017/0006499 | A1* | 1/2017 | Hampel | H04W 28/10 |
| 2017/0245179 | A1* | 8/2017 | Callard | H04W 24/04 |
| 2018/0295529 | A1* | 10/2018 | Jen | H04W 24/02 |
| 2018/0302807 | A1* | 10/2018 | Chen | H04L 45/22 |
| 2018/0359790 | A1* | 12/2018 | Ingale | H04W 72/048 |
| 2019/0053120 | A1* | 2/2019 | Park | H04W 76/27 |
| 2019/0182140 | A1* | 6/2019 | Tenny | H04L 41/12 |
| 2019/0327660 | A1* | 10/2019 | Hong | H04L 41/0813 |
| 2020/0007223 | A1* | 1/2020 | Zhu | H04B 7/15542 |
| 2020/0022054 | A1* | 1/2020 | Hong | H04W 36/0085 |
| 2020/0374871 | A1* | 11/2020 | Liu | H04W 56/0015 |
| 2020/0404518 | A1* | 12/2020 | Yuan | H04W 24/04 |
| 2021/0007011 | A1* | 1/2021 | Zhu | H04B 7/15542 |

OTHER PUBLICATIONS

AT&T: "Multi-connectivity Architecture Design for IAB Arch. 1a", 3GPP Draft; R3-185153, 3rd Generation Partnership Project (3GPP), Mobile Competence Centre; 650, Route Des Lucioles; F-06921 Sophia-Antipolis Cedex; France, vol. RAN WG3, No. Gothenburg, Sweden; Aug. 20, 2018-Aug. 24, 2018, Aug. 28, 2018, XP051528482, 17 Pages, Retrieved from the Internet: URL: http://www.3gpp.org/ftp/tsg%5Fran/WG3%5Flu/TSGR3%5F101/Docs/R3%2D185153%2Ezip [retrieved on Aug. 28, 2018] paragraphs [0002], [02.1], [8.2.2], [09.2]; figures 9.2.2, 9.2.3.

Ericsson et al: "TP to TR 38.874 on Support for Multiple Path Redundancy for IAB Nodes," 3GPP Draft; R3-184934 TP to TR 38.874 on Support for Multiple Path Redundancy for IAB Nodes, 3rd Generation Partnership Project (3GPP), Mobile Competence Centre; 650, Route Des Lucioles; F-06921 SOP vol. RAN WG3, No. Gothenburg, Sweden; Aug. 20, 2018-Aug. 24, 2018, Aug. 10, 2018, XP051528271, 9 pages, Retrieved from the Internet: URL: http://www.3gpp.org/ftp/tsg%5Fran/WG3%5Flu/TSGR3%5F101/Docs/R3%2D184934%2Ezip [retrieved on Aug. 10, 2018] paragraphs [02.2], [09.2]; figures 9.2.2, 9.2.3.

Ericsson et al: "TP to TR 38.874 on Using F1 Functionality to Support Redundant Paths," 3GPP Draft; R3-184935 TP to TR 38.874 on Using F1 Functionality to Support Reduant Paths, 3rd Generation Partnership Project (3GPP), Mobile Competence Centre; 650, Route Des Lucioles; F-06921 Sophia, vol. RAN WG3, No. Gothenburg, Sweden; Aug. 20, 2018-Aug. 24, 2018, Aug. 10, 2018, XP051528272, 5 Pages, Retrieved from the Internet: URL: http://www.3gpp.org/ftp/tsg%5Fran/WG3%5Flu/TSGR3%5F101/Docs/R3%2D184935%2Ezip [retrieved on Aug. 10, 2010] paragraph [0002]; figure 1.

Huawei et al: "Adaptation Layer based L2 Relaying and Light L2 Relaying", 3GPP Draft; R2-1806126 Adaptation Layer Based L2 Relaying and Light L2 Relaying, 3rd Generation Partnership Project (3GPP), Mobile Competence Centre; 650, Route Des Lucioles; F-06921 Sophia-Antipolis, vol. RAN WG2, No. Sanya, China; Apr. 16, 2018-Apr. 20, 2018, Apr. 14, 2018, XP051429700, 9 Pages, Retrieved from the Internet: URL: http://www.3gpp.org/ftp/Meetings%5F3GPP%5FSYNC/RAN2/Docs/ [retrieved on Apr. 14, 2018] paragraphs [02.2]-[02.3].

International Search Report and Written Opinion—PCT/US2019/051492—ISA/EPO—dated Dec. 2, 2019 (185133WO).

ZTE: "Discussion on IAB Node Discovery and Selection", 3GPP Draft; R3-183689—Discussion on IAB Node Discovery and Selection, 3rd Generation Partnership Project (3GPP), Mobile Competence Centre; 650, Route Des Lucioles; F-06921 Sophia-Antipolis Cedex; F, vol. RAN WG2, No. Montreal, Canada; Jul. 2, 2018-Jul. 6, 2018, Jul. 1, 2018, XP051467977, 4 Pages, Retrieved from the Internet: URL: http://www.3gpp.org/ftp/Meetings%5F3GPP%5FSYNC/RAN3/Docs [retrieved on Jul. 1, 2018] paragraph [02.2].

3rd Generation Partnership Project; Technical Specification Group Radio Access Network; NG-RAN; Architecture Description (Release 15), 3GPP TS 38.401 V15.2.0 (Jun. 2018), 3rd Generation Partnership Project (3GPP), Valbonne, France, Jun. 22, 2018, 39 pages, retrieved from the Internet: https://www.3gpp.org/ftp/Specs/archive/38_series/38.401.

* cited by examiner

RELAY NODES WITH MULTI-CONNECTED CELLULAR BACKHAUL

CROSS REFERENCE

The present Application for Patent claims the benefit of U.S. Provisional Patent Application No. 62/734,947 by HAMPEL, et al., entitled "RELAY NODES WITH MULTI-CONNECTED CELLULAR BACKHAUL," filed Sep. 21, 2018, assigned to the assignee hereof, and expressly incorporated herein.

INTRODUCTION

The following relates generally to wireless communications, and more specifically to managing relay nodes with multiple backhaul connections.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., 5G NR systems), infrastructure and spectral resources for NR access may additionally support wireless backhaul link capabilities in supplement to wireline backhaul connections, providing an integrated access and backhaul (IAB) network architecture. One or more base stations may include centralized units (CUs) and distributed units (DUs) and may be referred to as donor base stations. One or more DUs associated with a donor base station may be partially controlled by CUs associated with the donor base station. The one or more donor base stations (e.g., IAB donors) may be in communication with one or more additional base stations (e.g., IAB nodes or relay nodes) via supported access and backhaul links. IAB nodes may support mobile terminal (MT) functionality controlled and/or scheduled by DUs of a coupled IAB donor or parent IAB node, as well as DUs relative to additional entities (e.g., child IAB nodes, UEs, etc.) within the relay chain or configuration of the access network.

In some cases, upstream connections in IAB networks (e.g., a connection between a MT functionality of a relay node and a DU of a parent node) may deteriorate due to, for example, loss of uplink synchronization, adverse channel conditions, communications interference, etc. Such may result in reduced throughput, radio link failure (RLF) procedures, increased latency, etc., which may hinder system performance.

SUMMARY

The described techniques relate to improved methods, systems, devices, or apparatuses, in accordance with various aspects of the present disclosure. Generally, the described techniques provide for configuration of relay nodes supporting multiple MT functions with multi-connected cellular backhaul. For example, a network management function (e.g., of an IAB network architecture) may configure multiple (e.g., redundant) backhaul routes for relay nodes with multiple MT functions, where each MT function may support a wireless backhaul link (e.g., through different parent nodes of the IAB network).

In some examples, a network management function may have explicit awareness and control over multi-MT operation. For example, a relay node (e.g., supporting multiple MT functions) may establish a first backhaul link between a first MT and a first parent node (e.g., a first parent node under the control of the network management function). The relay node may transmit, via the first backhaul link using the first MT function, a capability report to the network management function. The capability report may include capabilities of the relay node in terms of MT functionality (e.g., a number of MT functions supported, identifiers of the MTs supported, isolation between different MT functions, etc.) as well as capabilities of individual MT functions (e.g., such as radio access technologies (RATs) supported by a second MT function, frequency bands supported by the second MT function, azimuth and elevation patterns supported by the second MT function, etc.). The network management function may receive the capabilities report from the first MT of the relay node (e.g., via the first backhaul link), and may identify a measurement configuration for the relay node (e.g., based on the capabilities indicated by the relay node). The measurement configuration may include identification of MT functions to perform measurements, identification of parent nodes to be measured, identification of measurements to be taken (e.g., received signal strength indicator (RSSI) measurements, reference signal received power (RSRP) measurements, etc.), etc. The network management function may then transmit the measurement configuration to the relay node via the first backhaul link.

The relay node may receive the measurement configuration, and may perform (e.g., using the second MT function) measurements of a second parent node according to the measurement configuration. The relay node may transmit a measurement report, including the measurement information, to the network management function via the first backhaul link to the first parent node. The network management function may then identify a backhaul link configuration for the second MT function based on the received measurement report. In some cases, the backhaul link configuration may include information regarding second backhaul link establishment and operation (e.g., identification of a second parent node to connect to, route utilization information, link utilization information, resource allocation information, etc.). The network function may transmit the backhaul link configuration to the relay node via the first backhaul link. The relay node may establish the second backhaul link between the second MT and the second parent node based on the backhaul link configuration. Further, the second MT may use the backhaul link in accordance with the configuration. For example, in some cases, the first and second backhaul links may be used simultaneously (e.g., in parallel). In other cases, the second backhaul link may be used as a backup backhaul link.

In other examples, relay node MT functions may autonomously connect to parent nodes, and a network management function may coordinate backhaul configuration in scenarios where multiple MT functions associated with a same relay node autonomously (e.g., independently) connect to the network management function over two or more backhaul links. For example, a relay node may establish a first backhaul link between a first MT and a first parent node (e.g., according to some performed measurements and parent-selection policy), and may further establish a second backhaul link between a second MT and a second parent node (e.g., according to some performed measurements and parent selection policy). The relay node may exchange an identifier of the relay node using the first MT with a first network management function (e.g., the first network management function may generate a relay identifier for the relay node and transmit the relay identifier to the first MT, or the relay node may identify a relay identifier and transmit the relay identifier to the network management function). The relay node may then, using the second MT, transmit the relay identifier to a second network management function via the second backhaul link to the second parent node (e.g., where the second network management function may be the same as or different from the first network management function, to be determined as discussed below).

In cases where the relay node autonomous connects to two parent nodes under the control of the same network management function (e.g., in cases where the first network management function is the same as the second network management function), the network management function may receive the relay identifier over the two links (e.g., from the first and second parent nodes) and may identify the relay node is dual-connected to the network management function. In such cases, the network management function may coordinate use of the first and second backhaul links based on the identification that the relay node is dual-connected to the network management function (e.g., the network management function may transmit a backhaul link configuration to the second MT over the second link, or may transmit a backhaul link configuration for the second MT over the first link to the first MT, where the backhaul link configuration includes an identifier of the second MT). In cases where the relay node autonomously connects to parent nodes under the control of different network management functions, the relay node may be single-connected to the two different network management functions.

A method of wireless communication at a relay node is described. The method may include transmitting, using a first mobile terminal function of the relay node, a measurement report to a network management function via a first backhaul link to a first parent node, where the measurement report includes a measurement of a second parent node transmission. The method may further include receiving, via the first backhaul link using the first mobile terminal function of the relay node, a backhaul link configuration for the second mobile terminal function based on the transmitted measurement report, and establishing a second backhaul link between the second mobile terminal function of the relay node and the second parent node based on the received backhaul link configuration.

An apparatus for wireless communication at a relay node is described. The apparatus may include a processor, memory in electronic communication with the processor, and instructions stored in the memory. The instructions may be executable by the processor to cause the apparatus to transmit, using a first mobile terminal function of the relay node, a measurement report to a network management function via a first backhaul link to a first parent node, where the measurement report includes a measurement of a second parent node transmission. The instructions may be executable by the processor to further cause the apparatus to receive, via the first backhaul link using the first mobile terminal function of the relay node, a backhaul link configuration for the second mobile terminal function based on the transmitted measurement report, and establish a second backhaul link between the second mobile terminal function of the relay node and the second parent node based on the received backhaul link configuration.

Another apparatus for wireless communication at a relay node is described. The apparatus may include means for transmitting, using a first mobile terminal function of the relay node, a measurement report to a network management function via a first backhaul link to a first parent node, where the measurement report includes a measurement of a second parent node transmission. The apparatus may further include means for receiving, via the first backhaul link using the first mobile terminal function of the relay node, a backhaul link configuration for the second mobile terminal function based on the transmitted measurement report, and establishing a second backhaul link between the second mobile terminal function of the relay node and the second parent node based on the received backhaul link configuration.

A non-transitory computer-readable medium storing code for wireless communication at a relay node is described. The code may include instructions executable by a processor to transmit, using a first mobile terminal function of the relay node, a measurement report to a network management function via a first backhaul link to a first parent node, where the measurement report includes a measurement of a second parent node transmission. The code may include instructions further executable by a processor to receive, via the first backhaul link using the first mobile terminal function of the relay node, a backhaul link configuration for the second mobile terminal function based on the transmitted measurement report, and establish a second backhaul link between the second mobile terminal function of the relay node and the second parent node based on the received backhaul link configuration.

Some examples of the method, apparatuses, and non-transitory computer-readable medium described herein may further include operations, features, means, or instructions for receiving a routing configuration for the first backhaul link and the second backhaul link, where the routing configuration includes route utilization information, link utilization information, resource allocation information, or some combination thereof.

Some examples of the method, apparatuses, and non-transitory computer-readable medium described herein may further include operations, features, means, or instructions for transmitting, via the first backhaul link using the first mobile terminal function, a capability report to the network management function, receiving, via the first backhaul link using the first mobile terminal function of the relay node, a measurement configuration for the second mobile terminal function of the relay node based on the transmitted capability report and performing, using the second mobile terminal function of the relay node, measurements of the second parent node transmission based on the measurement configuration, where the transmitted measurement report includes the measurements.

In some examples of the method, apparatuses, and non-transitory computer-readable medium described herein, the capability report includes an identifier of the second mobile terminal function, one or more RATs supported by the second mobile terminal function, one or more frequency bands supported by the second mobile terminal function, azimuth and elevation patterns supported by the second mobile terminal function, radio frequency (RF) capabilities of the second mobile terminal function, isolation between the first and second mobile terminal function, an identifier of the relay node, a list of supported mobile terminal functions, or some combination thereof.

In some examples of the method, apparatuses, and non-transitory computer-readable medium described herein, the measurement configuration includes an identifier of the second mobile terminal function, an identifier of the second parent node, or some combination thereof. In some examples of the method, apparatuses, and non-transitory computer-readable medium described herein, the backhaul link configuration for the second mobile terminal function includes an identifier of the second mobile terminal function of the relay node, an identifier of the second parent node, a route configuration parameter, or some combination thereof.

In some examples of the method, apparatuses, and non-transitory computer-readable medium described herein, the backhaul link configuration for the second mobile terminal function may be received in a container of a radio resource control (RRC) message received by the first mobile terminal function. In some examples of the method, apparatuses, and non-transitory computer-readable medium described herein, the backhaul link configuration for the second mobile terminal function may be received in F1 application protocol (F1-AP) signaling. In some examples of the method, apparatuses, and non-transitory computer-readable medium described herein, the first parent node and the second parent node may be associated with the network management function supported by a CU.

In some examples of the method, apparatuses, and non-transitory computer-readable medium described herein, the network management function includes a Next Generation Node B (gNB), a gNB-central unit (gNB-CU), a gNB-CU-control plane (gNB-CU-CP), an evolved Node B (eNB), an eNB-central unit (eNB-CU), an eNB-CU-control plane (eNB-CU-CP), a centralized controller, a topology function, a route function, a resource function, or some combination thereof.

A method of wireless communication is described. The method may include receiving, by a network management function via a first backhaul link, a measurement report from a first mobile terminal function of a relay node, where the measurement report includes a measurement of a second parent node transmission. The method may further include identifying a backhaul link configuration for the second mobile terminal function based on the received measurement report, and transmitting, by the network management function via the first backhaul link, the identified backhaul link configuration for the second mobile terminal function to the first mobile terminal function of the relay node.

An apparatus for wireless communication is described. The apparatus may include a processor, memory in electronic communication with the processor, and instructions stored in the memory. The instructions may be executable by the processor to cause the apparatus to receive, by a network management function via a first backhaul link, a measurement report from a first mobile terminal function of a relay node, where the measurement report includes a measurement of a second parent node transmission. The instructions may be executable by the processor to further cause the apparatus to identify a backhaul link configuration for the second mobile terminal function based on the received measurement report, and transmit, by the network management function via the first backhaul link, the identified backhaul link configuration for the second mobile terminal function to the first mobile terminal function of the relay node.

Another apparatus for wireless communication is described. The apparatus may include means for receiving, by a network management function via a first backhaul link, a measurement report from a first mobile terminal function of a relay node, where the measurement report includes a measurement of a second parent node transmission. The apparatus may further include means for identifying a backhaul link configuration for the second mobile terminal function based on the received measurement report, and transmitting, by the network management function via the first backhaul link, the identified backhaul link configuration for the second mobile terminal function to the first mobile terminal function of the relay node.

A non-transitory computer-readable medium storing code for wireless communication is described. The code may include instructions executable by a processor to receive, by a network management function via a first backhaul link, a measurement report from a first mobile terminal function of a relay node, where the measurement report includes a measurement of a second parent node transmission. The code may include instructions further executable by a processor to identify a backhaul link configuration for the second mobile terminal function based on the received measurement report, and transmit, by the network management function via the first backhaul link, the identified backhaul link configuration for the second mobile terminal function to the first mobile terminal function of the relay node.

Some examples of the method, apparatuses, and non-transitory computer-readable medium described herein may further include operations, features, means, or instructions for transmitting, by the network management function, a routing configuration for a second backhaul link, between the second mobile terminal function of the relay node and the first parent node, and a first backhaul link, between the first MT of the relay node and the first parent node, where the routing configuration includes route utilization information, link utilization information, resource allocation information, or some combination thereof.

Some examples of the method, apparatuses, and non-transitory computer-readable medium described herein may further include operations, features, means, or instructions for receiving, by the network management function via the first backhaul link, a capability report from the first mobile terminal function of the relay node, where the capability report includes capability information for the second mobile terminal function of the relay node, identifying a measurement configuration for the second mobile terminal function of the relay node based on the received capability report and transmitting, by the network management function via the first backhaul link, the identified measurement configuration to the first mobile terminal function, where the measurement report may be received based on the transmitted measurement configuration.

In some examples of the method, apparatuses, and non-transitory computer-readable medium described herein, the capability report includes an identifier of the second mobile terminal function, one or more RATs supported by the second mobile terminal function, one or more frequency bands supported by the second mobile terminal function, azimuth and elevation patterns supported by the second mobile terminal function, RF capabilities of the second mobile terminal function, isolation between the first mobile terminal function and the second mobile terminal function, an identifier of the relay node, a list of supported mobile terminal functions, or some combination thereof.

In some examples of the method, apparatuses, and non-transitory computer-readable medium described herein, the measurement configuration includes an identifier of the second mobile terminal function, an identifier of the second parent node, or some combination thereof. In some examples of the method, apparatuses, and non-transitory computer-readable medium described herein, the backhaul link configuration for the second mobile terminal function includes an identifier of the second mobile terminal function of the relay node, an identifier of the second parent node, route configuration parameters, or some combination thereof.

In some examples of the method, apparatuses, and non-transitory computer-readable medium described herein, the backhaul link configuration for the second mobile terminal function may be transmitted in a container of a RRC message to the first mobile terminal function. In some examples of the method, apparatuses, and non-transitory computer-readable medium described herein, the backhaul link configuration for the second mobile terminal function may be transmitted in F1-AP signaling. In some examples of the method, apparatuses, and non-transitory computer-readable medium described herein, the first backhaul link, between the first mobile terminal function of the relay node and the first parent node, and a second backhaul link, between the second mobile terminal function of the relay node and the first parent node, may be associated with a cellular RAT.

A method of wireless communication at a relay node is described. The method may include exchanging, using a first mobile terminal function of the relay node, an identifier of the relay node with a first network management function via a first backhaul link to a first parent node and transmitting, using a second mobile terminal function of the relay node, the identifier of the relay node to a second network management function via a second backhaul link to a second parent node. The method may further include receiving a backhaul link configuration for the second mobile terminal function based on the transmission of the identifier of the relay node to the first network management function via the first backhaul link and the transmission of the identifier of the relay node to the second network management function via the second backhaul link.

An apparatus for wireless communication at a relay node is described. The apparatus may include a processor, memory in electronic communication with the processor, and instructions stored in the memory. The instructions may be executable by the processor to cause the apparatus to exchange, using a first mobile terminal function of the relay node, an identifier of the relay node with a first network management function via a first backhaul link to a first parent node and transmit, using a second mobile terminal function of the relay node, the identifier of the relay node to a second network management function via a second backhaul link to a second parent node. The instructions may be executable by the processor to further cause the apparatus to receive a backhaul link configuration for the second mobile terminal function based on the transmission of the identifier of the relay node to the first network management function via the first backhaul link and the transmission of the identifier of the relay node to the second network management function via the second backhaul link.

Another apparatus for wireless communication at a relay node is described. The apparatus may include means for exchanging, using a first mobile terminal function of the relay node, an identifier of the relay node with a first network management function via a first backhaul link to a first parent node and transmitting, using a second mobile terminal function of the relay node, the identifier of the relay node to a second network management function via a second backhaul link to a second parent node. The apparatus may further include means for receiving a backhaul link configuration for the second mobile terminal function based on the transmission of the identifier of the relay node to the first network management function via the first backhaul link and the transmission of the identifier of the relay node to the second network management function via the second backhaul link.

A non-transitory computer-readable medium storing code for wireless communication at a relay node is described. The code may include instructions executable by a processor to exchange, using a first mobile terminal function of the relay node, an identifier of the relay node with a first network management function via a first backhaul link to a first parent node, transmit, using a second mobile terminal function of the relay node, the identifier of the relay node to a second network management function via a second backhaul link to a second parent node, and receive a backhaul link configuration for the second mobile terminal function based on the transmission of the identifier of the relay node to the first network management function via the first backhaul link and the transmission of the identifier of the relay node to the second network management function via the second backhaul link.

Some examples of the method, apparatuses, and non-transitory computer-readable medium described herein may further include operations, features, means, or instructions for exchanging backhaul information with the first network management function via the first backhaul link to the first parent node using the first mobile terminal function, with the second network management function via the second backhaul link to the second parent node using the second mobile terminal function, or both, based on the received backhaul link configuration.

Some examples of the method, apparatuses, and non-transitory computer-readable medium described herein may further include operations, features, means, or instructions for establishing the first backhaul link between the first mobile terminal function of the relay node and the first parent node, where the identifier of the relay node may be transmitted to the first network management function via the established first backhaul link and establishing the second backhaul link between the second mobile terminal function of the relay node and the second parent node, where the identifier of the relay node may be transmitted to the second network management function via the established second backhaul link.

Some examples of the method, apparatuses, and non-transitory computer-readable medium described herein may further include operations, features, means, or instructions for receiving an identifier of the first network management function associated with the first backhaul link and receiving an identifier of the second network management function associated with the second backhaul link. Some examples of the method, apparatuses, and non-transitory computer-readable medium described herein may further include operations, features, means, or instructions for determining the identifier of the first management function associated with the first backhaul link may be different from the identifier of the second management function associated with the second backhaul link and identifying the backhaul link configuration for the second mobile terminal function may be associated with the second management function of the second backhaul link.

Some examples of the method, apparatuses, and non-transitory computer-readable medium described herein may further include operations, features, means, or instructions for determining the identifier of the first management function associated with the first backhaul link may be the same as the identifier of the second management function associated with the second backhaul link and identifying the backhaul link configuration for the second mobile terminal function may be associated with a same management function of the first backhaul link and second backhaul link.

In some examples of the method, apparatuses, and non-transitory computer-readable medium described herein, establishing the second backhaul link between the second mobile terminal function of the relay node and the second parent node further may include operations, features, means, or instructions for performing, using the second mobile terminal function, one or more signal strength measurements of one or more parent nodes and identifying the second parent node based on the one or more signal strength measurements, where the second backhaul link may be established based on the identified second parent node.

Some examples of the method, apparatuses, and non-transitory computer-readable medium described herein may further include operations, features, means, or instructions for receiving, using the first mobile terminal function of the relay node, a measurement configuration for the second mobile terminal function, where the one or more signal strength measurements may be performed based on the received measurement configuration. Some examples of the method, apparatuses, and non-transitory computer-readable medium described herein may further include operations, features, means, or instructions for exchanging backhaul information using the first backhaul link, the second backhaul link, or both, based on the received backhaul link configuration.

Some examples of the method, apparatuses, and non-transitory computer-readable medium described herein may further include operations, features, means, or instructions for transmitting, using the second mobile terminal function, a capability report to the second parent node, where the capability report includes an identifier of the second mobile terminal function, one or more RATs supported by the second mobile terminal function, one or more frequency bands supported by the second mobile terminal function, azimuth and elevation patterns supported by the second mobile terminal function, RF capabilities of the second mobile terminal function, isolation between the first mobile terminal function and the second mobile terminal function, an identifier of the relay node, a list of supported mobile terminal functions, or some combination thereof.

In some examples of the method, apparatuses, and non-transitory computer-readable medium described herein, the first network management function and the second network management function each include a gNB, a gNB-CU, a gNB-CU-CP, an eNB, an eNB-CU, an eNB-CU-CP, a centralized controller, a topology function, a route function, a resource function, or some combination thereof.

A method of wireless communication at a CU is described. The method may include identifying a relay node is connected to a first parent node via a first mobile terminal function of the relay node, identifying the relay node is connected to a second parent node via a second mobile terminal function of the relay node, and transmitting a backhaul link configuration for the second mobile terminal function based on the identified relay node connections.

An apparatus for wireless communication at a CU is described. The apparatus may include a processor, memory in electronic communication with the processor, and instructions stored in the memory. The instructions may be executable by the processor to cause the apparatus to identify a relay node is connected to a first parent node via a first mobile terminal function of the relay node, identify the relay node is connected to a second parent node via a second mobile terminal function of the relay node, and transmit a backhaul link configuration for the second mobile terminal function based on the identified relay node connections.

Another apparatus for wireless communication at a CU is described. The apparatus may include means for identifying a relay node is connected to a first parent node via a first mobile terminal function of the relay node, identifying the relay node is connected to a second parent node via a second mobile terminal function of the relay node, and transmitting a backhaul link configuration for the second mobile terminal function based on the identified relay node connections.

A non-transitory computer-readable medium storing code for wireless communication at a CU is described. The code may include instructions executable by a processor to identify a relay node is connected to a first parent node via a first mobile terminal function of the relay node, identify the relay node is connected to a second parent node via a second mobile terminal function of the relay node, and transmit a backhaul link configuration for the second mobile terminal function based on the identified relay node connections.

Some examples of the method, apparatuses, and non-transitory computer-readable medium described herein may further include operations, features, means, or instructions for receiving backhaul information from the first mobile terminal function of the relay node via the first parent node, from the second mobile terminal function of the relay node via the second parent node, or both, based on the transmitted backhaul link configuration. Some examples of the method, apparatuses, and non-transitory computer-readable medium described herein may further include operations, features, means, or instructions for transmitting a network management function identifier to the relay node via the first parent node and transmitting the management function identifier to the relay node via the second parent node.

In some examples of the method, apparatuses, and non-transitory computer-readable medium described herein, identifying the relay node may be connected to the second parent node via the second mobile terminal function of the relay node may include operations, features, means, or instructions for receiving an identifier of the relay node from the first parent node and receiving the identifier of the relay node from the second parent node, where the identification that the relay node may be connected to the second parent node via the second mobile terminal function of the relay node may be based on the identifier of the relay node from the second parent node being the same as the identifier of the relay node from the first parent node.

Some examples of the method, apparatuses, and non-transitory computer-readable medium described herein may further include operations, features, means, or instructions for transmitting a measurement configuration for the second mobile terminal function to the relay node, where the measurement configuration includes an identifier of the second parent node, policy information for relay node selection of the second parent node, or some combination thereof. In some examples of the method, apparatuses, and non-transitory computer-readable medium described herein, the backhaul link configuration for the second mobile terminal function may be transmitted in a container of a RRC message to the first mobile terminal function. In some examples of the method, apparatuses, and non-transitory computer-readable medium described herein, the backhaul link configuration for the second MT may be transmitted in F1-AP signaling.

DETAILED DESCRIPTION

Figure 1:
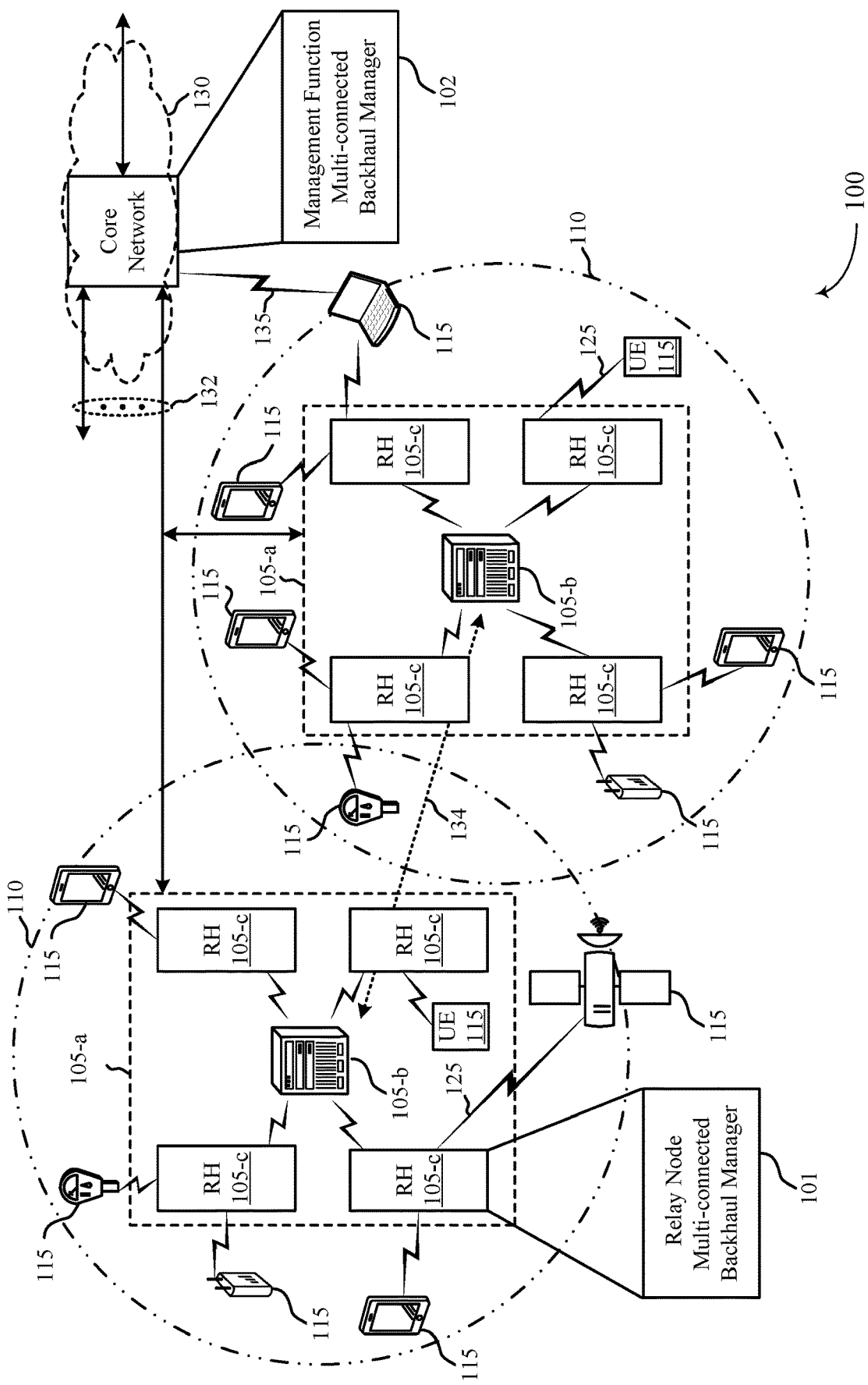
FIG. 1 illustrates an example of a system for wireless communications that supports relay nodes with multi-connected cellular backhaul in accordance with one or more aspects of the present disclosure.

In some wireless communications systems (e.g., 5G NR systems), infrastructure and spectral resources for NR access may additionally support wireless backhaul link capabilities in supplement to wireline backhaul connections, providing an IAB network architecture. One or more base stations may include CUs and DUs and may be referred to as donor base stations (e.g., or IAB donors). One or more DUs associated with a donor base station may be partially controlled by CUs associated with the donor base station. A base station CU may be a component of a database, data center, core network, or network cloud. A network node associated with a RAT may communicate with a donor base station CU via a backhaul link (e.g., wireline backhaul or wireless backhaul). The one or more donor base stations (e.g., IAB donors) may be in communication with one or more additional base stations (e.g., IAB nodes or relay nodes) and UEs. IAB nodes may support MT functionality controlled and scheduled by an IAB donor and/or parent IAB nodes relative to the MT supported IAB nodes. IAB nodes may additionally support DU operability relative to additional entities (e.g., child IAB nodes, UEs, etc.) within the relay chain or configuration of the access network (e.g., relative to entities downstream from the IAB node). For example, an IAB network architecture may include a chain of connected wireless devices (e.g., starting with a donor base station and ending with a UE, with any number of IAB relay nodes in between) via link resources that support NR access and backhaul capabilities (e.g., a wireline backhaul or wireless backhaul).

A relay node may refer to an intermediary node in a relay chain (e.g., an IAB relay chain). For example, a relay node may relay communications between a parent node (e.g., an IAB donor, or an IAB node upstream or higher on the relay chain) and a child node (e.g., an IAB node downstream or lower on the relay chain). In some cases, the relay node may refer to the DU or access node function (AN-F) of an intermediary IAB node. A child node may refer to an IAB-Node (e.g., the MT of the IAB-Node) or a UE that is the child of another IAB-Node (e.g., such as the relay node). A parent node in communication with the relay node may refer to an upstream IAB-Node or an IAB-donor (e.g., the DU/AN-F of the IAB-Node or IAB-Donor). In some cases, a parent node may be referred to as a control node (e.g., a control node may refer to a parent node or a DU of a parent node in communication with an MT of a relay node or other intermediary IAB node).

Techniques provided herein may enhance the efficiency of certain wireless communications systems, including systems that use wireless connections between nodes (e.g., base stations) for backhaul communications. In wireless communications systems that employ wireline links for backhaul communications, a wireless node may enjoy a robust wireline link to a network entity that coordinates aspects of backhaul communications (e.g., the network entity provides timing information, cell identity, etc.) for neighboring nodes to coordinate backhaul transmissions. However, in some systems, deploying a wireline link to wireless nodes may result in substantial expense and resource expenditure. For example, wireless nodes operating in millimeter wave (mmW) frequency ranges may be associated with a reduced coverage area (e.g., a smaller geographic footprint, directional transmissions, etc.), which may result in a deployment of a larger number of access nodes (e.g., wireless nodes or IAB nodes) to provide acceptable coverage areas to users. As a result, a number of wireless nodes within the wireless communication system may not be coupled with a wireline backhaul link and may instead use wireless backhaul links for backhaul communications in a wireless backhaul network (e.g., such as an IAB network).

The described techniques provide for maintenance of wireless backhaul connections through use of multiple wireless backhaul links. For example, in some cases, a relay node may support multiple MT functionalities (e.g., a relay node may include multiple MT entities), and may connect to different parent IAB nodes using the different MT functionalities. As such, a relay node may establish multiple paths (e.g., redundant paths) for multiple wireless backhaul links. That is, a relay node may establish multiple wireless backhaul links through different paths of the relay chain via multiple MT links to different parent nodes connected to the same CU or network management function. In some cases, all of the established wireless backhaul links (e.g., wireless backhaul links established by each MT of the relay node) may be used in parallel (e.g., simultaneously) for backhaul communications. In other cases, a subset of the wireless backhaul links may be used for backhaul communications, and the remaining wireless backhaul links may be used for backup purposes (e.g., in cases where the subset of backhaul links deteriorates due to loss of uplink synchronization, poor channel conditions, communications interference, etc.).

The described techniques further provide mechanisms for network management function (e.g., network or CU) coordination and configuration of such multiple wireless backhaul links. In some cases, where a relay node supports multiple (e.g., more than 1) MT functionalities, the network management function may be informed of the relay nodes capabilities relating to MT functionality. For example, a relay node may establish a first backhaul link to the network management function using a first MT function (e.g., to a first parent node). The relay node may use the first backhaul link to transmit a capability report (e.g., a list or identifiers of additional supported MT functions, RATs supported by the additional MT functions, frequency bands supported by the additional MT functions, RF capabilities of the additional MT functions, etc.) to the network management function (e.g., via the first backhaul link to the first parent node). The network management function may then identify a measurement configuration for some or all of the additional MT functions of the relay node based on the capability report (e.g., based on the capabilities of the additional MT functions supported by the relay node). The network management function may transmit the measurement configuration to the relay node via the first backhaul link. The relay node may perform, using one or all of the additional MT functions, measurements of parent nodes in accordance with the measurement configuration (e.g., the measurement configuration may include identification of the additional MT functions to perform the measuring, identification of parent nodes to be measured, etc.). The relay node may then transmit, using the first MT function of the relay node, the measurement report to the network management function via the first backhaul link.

The network management function may thus coordinate and configure additional backhaul links for the relay node based on the received measurement report. For example, the network management function may transmit a backhaul link configuration for the second MT function to the relay node via the first backhaul link, and the relay node may establish a second wireless backhaul link to a second parent node (e.g., where the second MT function and the second parent node may be indicated by the backhaul link configuration).

In other examples, multiple MT functions of a relay node may autonomously connect to different parent nodes (e.g., which may or may not be associated with a same network management function). For example, in some cases, MT functions of a relay node may autonomously search for a parent node (e.g., perform parent node transmission measurements). In such examples, the relay node may exchange (e.g., using a first MT function of the relay node) an identifier of the relay node with a first network management function via a first backhaul link to a first parent node. The relay node may also transmit (e.g., using a second MT function of the relay node) the identifier of the relay node to a second network management function via a second backhaul link to a second parent node. As such, in cases where both parent nodes (e.g., or backhaul links) are associated with the same network management function, the management function may receive the relay node identifiers via the two backhaul links and may identify the relay node is capable of supporting the multiple backhaul links. In such cases, the network management function may transmit a backhaul link configuration (e.g., for the first MT function, the second MT function, or both) to the relay node (e.g., via the first backhaul link, the second backhaul link, or both) based on the identification that the relay node supports multiple backhaul link connections.

Beneficially, techniques supporting relay nodes with multi-connected backhaul links (e.g., multi-hop backhaul links) as described herein may improve backhaul communication robustness (e.g., may reduce service interruption, signaling delay, etc. associated with a deteriorating wireless backhaul link, through use of additional wireless backhaul links). A network management function may identify that a relay node supports multiple backhaul connections, and may coordinate and configure the multiple backhaul connections using the techniques described herein. For example, the network management function may thus configure use of parallel wireless backhaul links (e.g., which may increase backhaul throughput, add wireless link redundancy for more reliable backhaul communications, etc.). In other examples, the network management function may configure backup wireless backhaul links (e.g., which may be used in cases where the first or primary wireless backhaul link deteriorates, when the measurement report indicates a second wireless backhaul link may be more reliable, etc.).

Aspects of the disclosure are initially described in the context of a wireless communications system. Example wireless communications systems, flowcharts, and process flows implementing the discussed techniques are then described. Aspects of the disclosure are further illustrated by and described with reference to apparatus diagrams, system diagrams, and flowcharts that relate to relay nodes with multi-connected cellular backhaul.

FIG. 1 illustrates an example of a wireless communications system 100 that supports relay nodes with multi-connected cellular backhaul in accordance with one or more aspects of the present disclosure. The wireless communications system 100 includes network devices 105, UEs 115, and a core network 130. In some examples, the wireless communications system 100 may be a LTE network, a LTE-A network, a LTE-A Pro network, or a NR network. In some cases, wireless communications system 100 may support enhanced broadband communications, ultra-reliable (e.g., mission critical) communications, low latency communications, or communications with low-cost and low-complexity devices. Wireless communications system 100 may support signaling between network devices 105 for establishment of multiple backhaul connections for relay nodes (e.g., network devices 105) supporting multiple MT functions.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices 105 (e.g., network device 105-a), which may be an example of a base station (e.g., eNB, network access devices, gNB), or network device 105-b, which may be an example of an access node controller (ANC)), may interface with the core network 130 through backhaul links 132 (e.g., S1, S2) and may perform radio configuration and scheduling for communication with the UEs 115. In various examples, the network devices 105-b may communicate, either directly or indirectly (e.g., through core network 130), with each other over backhaul links 134 (e.g., X1, X2), which may be wired or wireless communication links.

Each network device 105-b may also additionally or alternatively communicate with a number of UEs 115 through a number of other network devices 105-c, where network device 105-c may be an example of a smart radio head (or through a number of smart radio heads). In alternative configurations, various functions of each network device 105 may be distributed across various network devices 105 (e.g., radio heads and access network controllers) or consolidated into a single network device 105 (e.g., a base station).

Network devices 105 may wirelessly communicate with UEs 115 via one or more base station antennas. Network device 105 described herein may include or may be referred to by those skilled in the art as a base transceiver station, a radio base station, an access point, a radio transceiver, a NodeB, an eNB, a next-generation Node B or giga-nodeB (either of which may be referred to as a gNB), a Home NodeB, a Home eNodeB, or some other suitable terminology. Wireless communications system 100 may include network devices 105 of different types (e.g., macro or small cell base stations). The UEs 115 described herein may be able to communicate with various types of network devices 105 and network equipment including macro eNBs, small cell eNBs, gNBs, relay base stations, and the like.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communications system 100 may include uplink transmissions from a UE 115 to a network device 105, or downlink transmissions from a network device 105 to a UE 115. Downlink transmissions may also be called forward link transmissions while uplink transmissions may also be called reverse link transmissions.

The geographic coverage area 110 for a network device 105 may be divided into sectors making up only a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communications system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. A UE 115 may communicate with the core network 130 through communication link 135.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 may communicate with the core network 130 and with one another. For example, network devices 105 may interface with the core network 130 through backhaul links 132 (e.g., via an S1, N2, N3, or other interface). Network devices 105 may communicate with one another over backhaul links 134 (e.g., via an X2, Xn, or other interface) either directly (e.g., directly between network devices 105) or indirectly (e.g., via core network 130).

Network devices 105 may support functionality for operations in an IAB network. For example, network devices 105 may be split into support entities (e.g., functionalities) for promoting wireless backhaul density in collaboration with NR communication access. In some cases, one or more network devices 105 may be split into associated base station CU and DU entities, where one or more DUs may be partially controlled by an associated CU. The CU entities of the one or more network devices 105 may facilitate connection between the core network 130 and the access network (e.g., via a wireline or wireless connection to the core network). The DUs of the one or more network devices 105 may control and/or schedule functionality for additional devices (e.g., one or more alternative network devices 105, UEs 115) according to configured access and backhaul links. Based on the supported entities at the one or more network devices 105, the one or more network devices 105 may be referred to as donor network devices (e.g., or IAB donors, donor base stations, etc.).

Additionally, in some cases, one or more network devices 105 may be split into associated MT and base station DU entities, where MT functionality of the one or more network devices 105 may be controlled and/or scheduled by the DU entities of the one or more donor network devices (e.g., via a Uu interface). DUs associated with the one or more network devices may be controlled by MT functionality. In addition, DUs of the one or more network devices 105 may be partially controlled by signaling messages from CU entities of associated donor network devices on the configured access and backhaul links of a network connection (e.g., via an F1-AP). The DUs of the one or more network devices 105 may support one of multiple serving cell coverage areas 110 of the network coverage area. The DUs of the one or more network devices 105 may control and/or schedule functionality for additional devices (e.g., one or more other network devices 105, UEs 115) according to configured access and backhaul links. Based on the supported entities at the one or more network devices 105, the base stations may be referred to as intermediary network devices (e.g., or IAB nodes, intermediary base stations, etc.).

At least some of the network devices, such as a network device 105, may include subcomponents such as an access network entity, which may be an example of an ANC. Each access network entity may communicate with UEs 115 through a number of other access network transmission entities, which may be referred to as a radio head, a smart radio head, or a transmission/reception point (TRP). In some configurations, various functions of each access network entity or network device 105 may be distributed across various network devices (e.g., radio heads and access network controllers) or consolidated into a single network device (e.g., a network device 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a network device 105 may use multiple antennas or antenna arrays to conduct beamforming operations for directional communications with a UE 115. For instance, some signals (e.g. synchronization signals, reference signals, beam selection signals, or other control signals) may be transmitted by a network device 105 multiple times in different directions, which may include a signal being transmitted according to different beamforming weight sets associated with different directions of transmission. Transmissions in different beam directions may be used to identify (e.g., by the network device 105 or a receiving device, such as a UE 115) a beam direction for subsequent transmission and/or reception by the network device 105. Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the network device 105 in different directions, and the UE 115 may report to the network device 105 an indication of the signal it received with a highest signal quality, or an otherwise acceptable signal quality. Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a network device 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a network device 105 or core network 130 supporting radio bearers for user plane data. At the Physical (PHY) layer, transport channels may be mapped to physical channels.

In some cases, UEs 115 and network devices 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a network device 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., network devices 105 or UEs 115) may have a hardware configuration that supports communications over a particular carrier bandwidth, or may be configurable to support communications over one of a set of carrier bandwidths. In some examples, the wireless communications system 100 may include network devices 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or network device 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100, one or more network devices 105 (e.g., a donor network device 105, a donor IAB node, a donor base station, etc.) may include CUs and DUs, where one or more DUs associated with a donor network device may be partially controlled by a CU associated with the donor network device. The network device CUs may be a component of a network management function, database, data center, or the core network 130 (e.g., a 5G NR core network (5GC)). In some cases, the network device CU may be in communication with the network management function (e.g., in some cases, the network management function may refer to a separate entity in communication with the network device CU). In some cases, a network management function may be referred to as a management function. A network device CU may communicate with a donor network device 105 via a backhaul link 132 (e.g., a wireline backhaul or a wireless backhaul).

As another example, in IAB networks, a network device CU (e.g., a donor network device 105) may communicate with the core network 130 (e.g., the NGC) via a backhaul link 132 (e.g., a wireline backhaul or wireless backhaul). The donor network device 105 may be referred to, for example in an IAB network, as an IAB donor and may be in communication with one or more IAB nodes (e.g., other network devices 105) operating as network device DUs relative to the IAB donor and one or more UEs.

For example, an IAB network may include a chain of wireless devices (e.g., starting with the donor network device 105 (a radio access network (RAN) node that terminates an interface with the core network) and ending with a UE 115, with any number of IAB nodes or relay network devices in between). IAB nodes (e.g., relay network devices, relay nodes, relay base stations etc.) may support MT functionality (which may also be referred to as UE functionality (UEF)) controlled and scheduled by an IAB donor, or another parent IAB node. IAB nodes (e.g., relay base stations, relay nodes, etc.) may also support DU functionality (which may also be referred to as access network functionality (ANF)) relative to additional entities (e.g., IAB nodes, UEs, etc.) within the relay chain or configuration of the access network (e.g., downstream). In some cases, MT functionality may refer to an implementation that supports at least some aspects of a MT or a UE (e.g., as defined by 3GPP TS 23.101 version 8.0.0 Release 8). These relay mechanisms may forward traffic along to the additional entities, extend the range of wireless access for one or more base stations, enhance the density of backhaul capability within serving cells, etc.

Wireless communications system 100 may employ one or more wired and wireless backhaul links (e.g., backhaul link 132 or backhaul link 134) for establishing connectivity between a core network (e.g., core network 130) and the one or more wireless nodes within wireless communications system 100. For example, wireless communications system 100 may include multiple network devices 105 (e.g., base stations, remote radio heads, etc.), where at least one network device 105 is coupled to a wireline backhaul link, such as an optical fiber cable. Additional network devices 105 may not be directly coupled to the core network 130 or to another network device 105 via a wired backhaul link, and may use wireless backhaul links to communicate backhaul traffic. In such cases, the network devices 105 may wirelessly communicate backhaul access traffic to a high-capacity fiber point (e.g., a location where a wireless node is coupled with a wireline link to core network 130). Each of the backhaul links 132 and 134 may carry packets from the one or more established PDN gateways through the SGi interface and subsequently direct the packets through the core network and to the coupled wireless nodes over the S1 interface.

While mobile access may sometimes be associated with single-hop communication links between a source and destination (e.g., an asymmetric link), wireless backhaul communications may support multi-hop transport and provide robustness through topological redundancy (e.g., alternative paths for data exchange within a wireless communications network). Accordingly, underlying links using wireless backhaul communications may be symmetric in nature and use large-scale resource coordination among the wireless communication links.

The relay node multi-connected backhaul manager 101 may transmit, using a first mobile terminal function of the relay node, a measurement report to a network management function via a first backhaul link to a first parent node, where the measurement report includes measurements of a second parent node transmission (e.g., of parent node reference signal transmission). Further, the relay node multi-connected backhaul manager 101 may receive, via the first backhaul link using the first mobile terminal function of the relay node, a backhaul link configuration for the second mobile terminal function based on the transmitted measurement report, and establish a second backhaul link between the second mobile terminal function of the relay node and the second parent node based on the received backhaul link configuration. Generally, relay node multi-connected backhaul manager 101 may be a component, function, or logic of a network device 105 (e.g., a network device 105-a, a network device 105-b, a network device 105-c, etc.).

The management function multi-connected backhaul manager 102 may receive, by a network management function via a first backhaul link, a measurement report from a first mobile terminal function of a relay node, where the measurement report includes measurements of a second parent node transmission and identify a backhaul link configuration for the second mobile terminal function based on the received measurement report. Further, the management function multi-connected backhaul manager 102 may transmit, via the first backhaul link, the identified backhaul link configuration for the second mobile terminal function to the first mobile terminal function of the relay node. Generally, the management function multi-connected backhaul manager 102 may be a component, function, or logic of core network 130.

The relay node multi-connected backhaul manager 101 may also exchange, using a first mobile terminal function of the relay node, an identifier of the relay node with a first network management function via a first backhaul link to a first parent node and transmit, using a second mobile terminal function of the relay node, the identifier of the relay node to a second network management function via a second backhaul link to a second parent node. Further, the relay node multi-connected backhaul manager 101 may receive a backhaul link configuration for the second mobile terminal function based on the transmission of the identifier of the relay node to the first network management function via the first backhaul link and the transmission of the identifier of the relay node to the second network management function via the second backhaul link.

The management function multi-connected backhaul manager 102 may also identify a relay node is connected to a first parent node via a first mobile terminal function of the relay node, identify the relay node is connected to a second parent node via a second mobile terminal function of the relay node, and transmit a backhaul link configuration for the second mobile terminal function based on the identified relay node connections.

Figure 2:
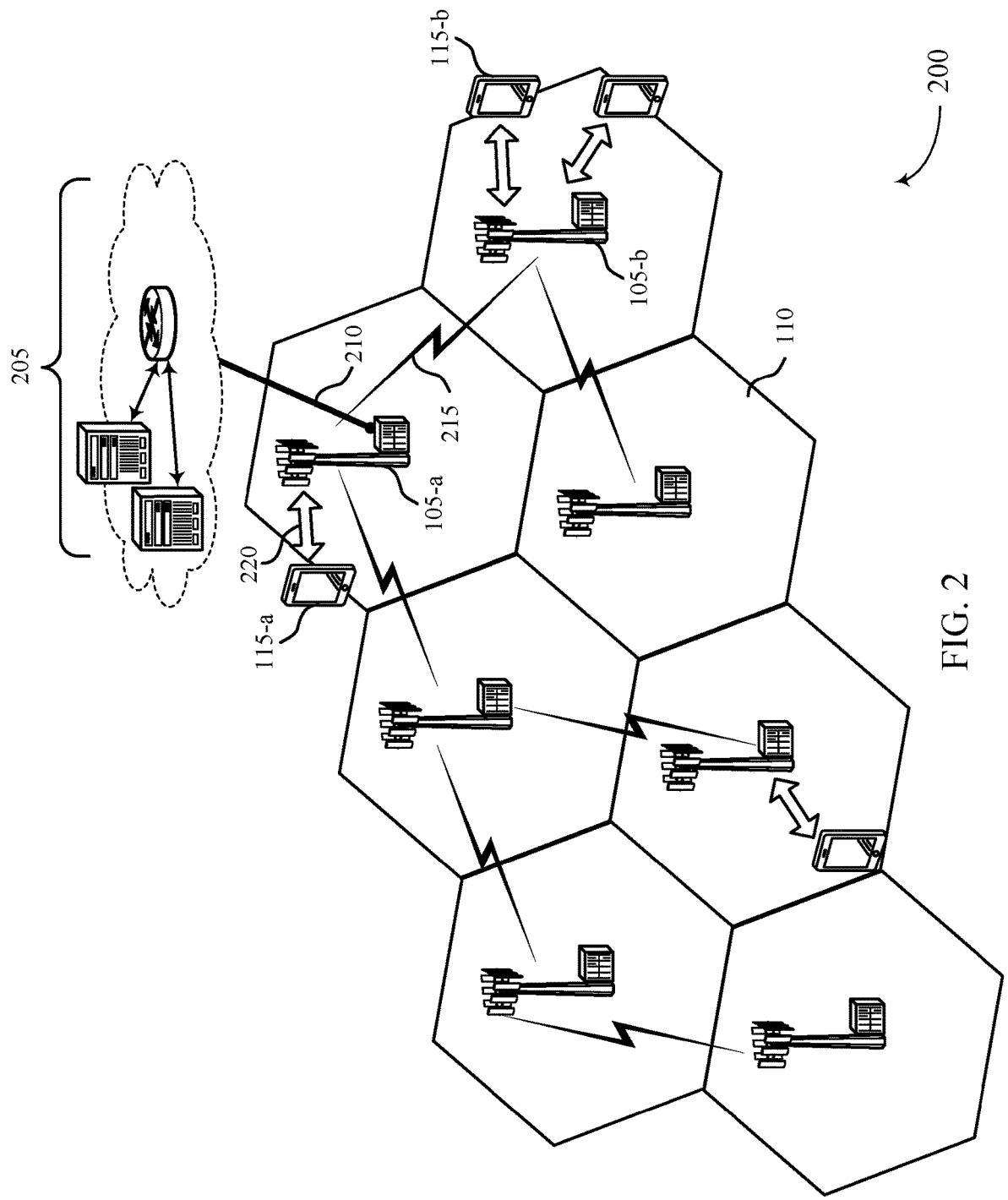
FIGS. 2 and 3 illustrate example wireless communications systems that support relay nodes with multi-connected cellular backhaul in accordance with one or more aspects of the present disclosure.

FIG. 2 illustrates an example of a wireless communications system 200 that supports aspects of relay nodes with multi-connected cellular backhaul in accordance with one or more aspects of the present disclosure. In some examples, wireless communications system 200 may implement aspects of wireless communications system 100. Wireless communications system 200 may support one or more base stations 105 (e.g., which may be examples of a network device 105 as described in FIG. 1) supporting network access to one or more UEs 115 within cell coverage areas 110 (e.g., which may be examples of UEs 115 and coverage areas 110 as described in FIG. 1). In some cases, the one or more cell coverage areas 110 may be non-collocated. Infrastructure and spectral resources for NR access within wireless communications system 200 may additionally support wireless backhaul link 215 capabilities in supplement to wireline backhaul connections 210, providing an IAB network architecture.

In some cases, base station 105-a may be split into associated base station CU and DU entities, where one or more DUs may be partially controlled by an associated CU. The CU entity of the base station 105-a may facilitate connection between the core network 205 and the access network (e.g., via a wireline backhaul connection 210 or wireless connection to the core network). The DUs of the base station 105-a may control and/or schedule functionality for additional devices (e.g., relay base stations, such as relay base station 105-b) according to configured wireless backhaul links 215 and access links 220. Based on the supported entities at the base station 105-a, the base station 105-a may be referred to as an IAB donor. Relay base station 105-b may support link connectivity with the IAB donor (e.g., base station 105-a) as part of a relay chain within the IAB network architecture. For example, base station 105-b may be split into associated MT and DU entities, where MT functionality of the base station 105-b may be controlled and/or scheduled by a DU entity of base station 105-a (e.g., an IAB donor). DUs associated with a base station 105-b may be controlled by MT functionality. In addition, in some cases, DUs of the base station 105-b may be partially controlled by signaling messages from CU entities of associated IAB donor nodes of the network connection (e.g., via an F1-AP). The DU of the base station 105-b may support a serving cell coverage area 110 of the IAB network coverage area. Based on the supported entities at the base station 105-b, the base station 105-b may be referred to as a relay base station, IAB node, relay node, etc.

Additionally, wireless communications system 100 may employ one or more wireless access links 220 for establishing mobile access to one or more coupled UEs 115. Each of the base stations 105 and the UEs 115 may be configured to support cellular RATs, such as mmW-based RATs, for access traffic between the UEs 115 and the base stations 105. Moreover, each of base stations 105 may share resources of the configured RATs for access traffic with backhaul traffic over the network (e.g., as in the case of IAB). IAB network solutions may be increasingly beneficial with the evolution of cellular technologies due to enhancements in wireless link capacity. Specifically, IAB network solutions may provide solutions to densification of network cells (i.e., cost reduction of small cell deployments) and increases in data traffic, as a means to maximize spectrum efficiency through joint optimization and integration of access and backhaul resources within the network. IAB network solutions may be particularly suitable for mmW RATs due to a large bandwidth per channel and the need to mitigate short term signal blocking.

An access link using a mmW-based RAT may be designed as an asymmetric single-hop link, which may be used for assigning control and scheduling tasks to base stations 105 while providing instruction to one or more UEs 115 for scheduling communication. In such cases, base stations 105 may coordinate wireless resources among multiple UEs 115, while each UE 115 may be assigned to one base station 105 at a time. In some cases, inter-node links may be symmetric in nature and may form mesh topologies for enhanced robustness, where wireless transport may occur along multiple hops.

Communication according to a particular RAT (e.g., mmW RAT) over an IAB network may enable one or more functionalities at the base stations 105 of the network. For example, each base station 105 may be configured for ANF and UEF to allow each base station 105 to act as a scheduling entity and a receiving (e.g., scheduled) entity. Each of the functionalities may be operated via each of the one or more backhaul links 215. ANF may enable the respective base stations 105 to operate as a scheduling entity over one or more access links 220, and communicate with one or more UEs 115 located within the IAB network. ANF may further enable the respective base stations 105 to operate as a scheduling entity over one or more coupled backhaul links 215, to facilitate communication between the one or more other base stations 105 of the IAB network (i.e., via the mesh topology). UEF functionality may enable the respective base station 105 to operate as a scheduled entity and communicate with one or more other base stations 105 to receive data. The combination of the UEF and ANF capability at each base station 105 of the IAB network may allow each of the base stations 105 to utilize switching operations over the wireless spectrum associated with the RAT, to transmit access traffic to/from UEs 115 and backhaul traffic to/from core network 130 providing coupled access to the one or more PDNs. Additionally, each of base stations 105 may include a routing table for examining a received data packet and forwarding the packet along the best path of the IAB network toward the specified IP address of the packet's destination.

Wireless communications system 200 may illustrate an example of a densified small cell system integrating access and backhaul links (e.g., allowing for self-backhauling of access traffic). Integrating access and backhaul links (e.g., integrating wireless backhaul links 215) may allow for such densified small cell systems, without the need for each cell (e.g., each base station 105) to be connected to a fiber point or wireline backhaul connection 210. Wireless communications system 200 may thus illustrate a multi-hop wireless backhaul network (e.g., with self-backhauling). Such densified small cell systems may provide for sub-6 frequencies which may, for example, provide for massive-MIMO technologies to improve spectral efficiency. In some cases, each relay base station 105 may be associated with a single MT function, and may thus employ backhaul relaying as shown. In some cases, relay base stations 105 may support multiple MT functions, in which case relay base stations 105 may be capable of multi-connected cellular backhaul (e.g., as described herein, for example, with reference to FIG. 3).

Figure 3:
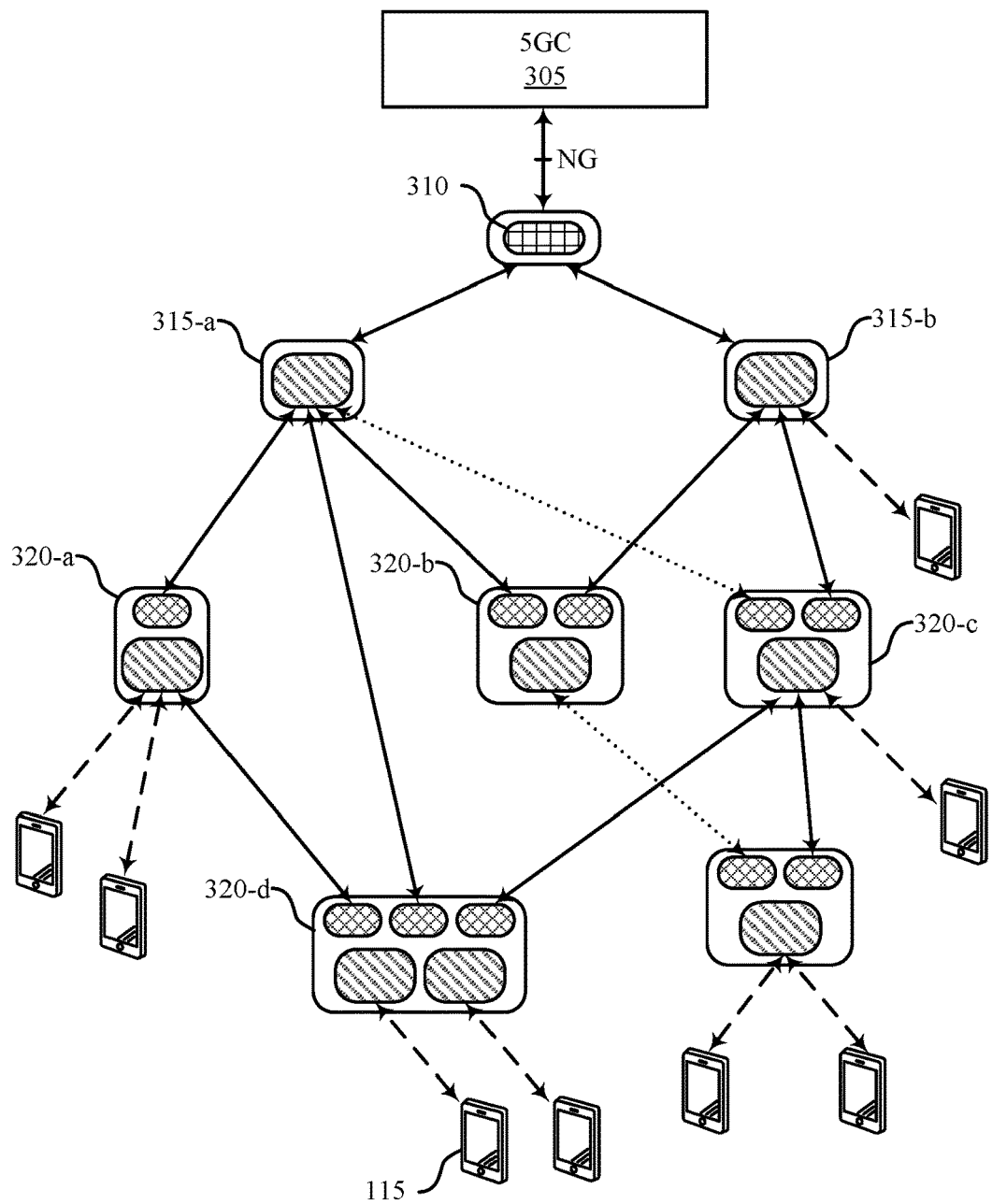

FIG. 3 illustrates an example of a wireless communications system 300 that supports relay nodes with multi-connected cellular backhaul in accordance with one or more aspects of the present disclosure. In some examples, wireless communications system 300 may implement aspects of wireless communications system 100 and wireless communications system 200, as described with reference to FIGS. 1 and 2. For example, FIG. 3 illustrates a wireless communications system 300 (e.g., a NR system) that supports sharing of infrastructure and spectral resources for NR access with wireless backhaul link capabilities, in supplement to wireline backhaul connections, providing an IAB network architecture. Wireless communications system 300 may include a core network 305 (e.g., NGC), and base stations or supported devices split into one or more support entities (e.g., functionalities) for promoting wireless backhaul density in collaboration with NR communication access. Aspects of the supporting functionalities of the base stations may be referred to as IAB nodes.

Wireless communications system 300 may include an IAB donor node split into associated base station CU 310 and DU 315 entities, where DUs 315 associated with the IAB donor node may be partially controlled by the associated CU 310. CUs 310 of IAB donor nodes may host layer 3 (L3) (e.g., RRC, service data adaptation protocol (SDAP), PDCP, etc.) functionality and signaling. Further CUs 310 of IAB donor nodes may communicate with core network 305 over, for example, an NG interface (which may be an example of a portion of a backhaul link). DUs 315 may host lower layer, such as layer 1 (L1) and layer 2 (L2) (e.g., RLC, MAC, PHY, etc.) functionality and signaling. A DU 315 entity of an IAB donor node may support one of multiple serving cells of the network coverage according to connections associated with backhaul and access links of the IAB network. DUs 315 of the IAB donor node may control both access links and backhaul links within the corresponding network coverage and may provide controlling and scheduling for descendant (e.g., child) relay IAB nodes 320 and/or UEs 115.

Relay IAB nodes 320 may be split into associated MT and DU entities. MT functionality (e.g., UEF) of the relay IAB nodes 320 may be controlled and/or scheduled by antecedent IAB nodes (e.g., by an IAB donor or another IAB node as its parent node) of the established connectivity via access and backhaul links of a coverage area. DUs associated with a relay IAB node 320 may be controlled by MT functionality of the node. In addition, DUs of the IAB nodes 320 may be partially controlled by signaling messages from CU 310 entities of associated IAB donor nodes of the network connection (e.g., via an F1-AP). The DUs of the IAB nodes 320 may support one of multiple serving cells of the network coverage area. DU functionality (e.g., ANF) may schedule child IAB nodes and UEs, and may control both access links and backhaul links under its coverage.

Each relay node may include at least one MT function and one DU. The relay may connect to a parent relay node or a donor node via each MT function, and may further support connections to UEs 115 and child relay nodes via the DU. In some cases, all DUs on relay nodes and donor nodes may be connected to a centralized donor CU (e.g., CU 310), which may hold a network management function, or be connected to a network management function. The network management function may support link management, route management, topology management, resource management, etc. for the wireless communications system 300 (e.g., the IAB network). The connection between DUs across wireless backhaul links may use a modified form of the F1 protocol (e.g., F1\*). Each relay node MT function may include a RRC connection to the CU 310. Further, each relay node DU may include a F1\* control plane connection to the CU 310. In this manner, the network management function may support link configuration, route configuration, and resource configuration tasks for the wireless backhaul topology.

Wireless communications system 300 may employ relay chains for communications within the IAB network architecture. For example, an IAB donor may support a primary backhaul link and one or more secondary (e.g., parallel or backup) backhaul links to relay IAB nodes 320. The IAB donor may further support one or more access links to additional devices (e.g., UEs 115) or entities of the network. In addition, MT functionality of each of the one or more relay IAB nodes 320 and UEs 115 may be configured to support network connectivity to multiple parent nodes via access and backhaul links associated with coverage areas of the IAB network.

For a relay IAB node to support multiple paths to the CU 310, the relay IAB node may hold multiple MT functions (e.g., multiple MTs). For example, relay IAB node 320-*a* may support a single MT function (e.g., and may have a single path, or backhaul link, to CU 310), relay IAB node 320-*b* may support two MT functions (e.g., and may have two paths, or two backhaul links, to CU 310), and relay IAB node 320-*d* may support a three MT functions (e.g., and may have three paths, or three backhaul links, to CU 310). In cases where a relay IAB node 320 supports multiple MT functions, each MT function may support connectivity to a different parent node. For example, for IAB relay node 320-*b*, a first MT function may establish a first backhaul link through a first parent node (e.g., DU 315-*a*) and a second MT function may establish a second backhaul link through a second parent node (e.g., DU 315-*b*). As another example, for IAB relay node 320-*d*, a first MT function may establish a first backhaul link through a first parent node (e.g., IAB node 320-*a*), a second MT function may establish a second backhaul link through a second parent node (e.g., DU 315-*a*), and a third MT function may establish a third backhaul link through a third parent node (e.g., IAB node 320-*c*, and eventually through DU 315-*a* or DU 315-*b* after relay by IAB node 320-*c*).

In such a manner, IAB nodes supporting multiple MT functions may support topological redundant paths in the wireless communications system 300. In some cases, a network management function (e.g., associated with CU 310) may configure multiple paths (e.g., multiple backhaul links) to be used in parallel or simultaneously (e.g., such as for relay IAB node 320-*b*). As discussed herein, use of parallel or simultaneous backhaul links may refer to operation of backhaul links in conjunction with each other (e.g., whether using each link for redundant communication of backhaul information, using each link for load balancing of backhaul information, etc.). As such, parallel backhaul link operation may refer backhaul links being active and available for backhauling, and may not necessarily imply both backhaul links must convey the same information at the same instance in time. In other cases, the network management function (e.g., associated with CU 310) may configure backup paths (e.g., or backup backhaul links) to be used in cases where the established backhaul link deteriorates, or an improved backhaul link is identified by the IAB relay node or network management function. For example, relay IAB node 320-*c* may backhaul communications through DU 315-*b*, but may be configured (e.g., by the network management function) with a backup backhaul link through DU 315-*a*. For example, the network management function may configure multiple MT function of a relay node to connect to different parent nodes to simultaneously use all link (e.g., backhaul links) the relay node has with its multiple parents, or the network management function may configure the relay node to only use a subset and keep the other links for backup purposes (e.g., shown as dotted lines).

Multi-path connectivity via such multiple backhaul links may provide robustness to radio link failure on backhaul links (e.g., on deteriorating backhaul links). Further, capacity optimization though load balancing across the multiple backhaul paths may also be realized (e.g., to increase backhaul throughput, reduce latency associated with backhaul over a single backhaul link, etc.). In order for a network management function to coordinate and configure multiple backhaul links (e.g., for relay nodes supporting multiple MT functions), the management function may first become away that a relay node supports such multiple MT functionality (e.g., and is therefore capable of multi-connected cellular backhaul).

Multiple MT functions residing on one relay node may have different properties (e.g., different MT functions of a relay node may cover different angular sectors, support different frequency bands, have different power levels, etc.).

Further, MT functions and DUs residing on the same relay node may have a relationship with each other (e.g., an MT and a DU may share a same antenna panel). Further, multiple MTs with different antenna panels may have limited antenna isolation, which may affect resource allocation for simultaneous (e.g., parallel) operation. To take full advantage of the multitude of MTs collocated on a relay (e.g., to maximize backhaul efficiency in wireless communications system 300), the network management function may be made aware of such aspects, and may have a means to configure multi-MT utilization accordingly.

A first MT function of a relay IAB node (e.g., relay IAB node 320-*d*) may establish a backhaul link with a first parent (e.g., IAB node 320-*a*) and transmit a list of MT-identifiers for the MTs supported (e.g., identification of the MT function(s) supported) to a network management function (e.g., via a first backhaul link to IAB node 320-*a*). In this manner, each MT function may be individually addressed by the network management function. In some cases, the relay IAB node 320-*d* may provide further details on the capabilities of each MT, inter-MT relations, etc. In some examples, the network management function may transmit a measurement configuration, to the first MT of IAB node 320-*d* via the first backhaul link, for a second MT function of IAB node 320-*d*. For example, the measurement configuration may include an identifier of the second MT function, one or more parent nodes to be measured by the second MT function, measurements to be received (e.g., RSSI, RSRP, etc.), etc. The second MT function of the IAB node 320-*d* may perform the measurements (e.g., of the indicated parent node(s), or of all detected parent nodes), and the IAB node 320-*d* may transmit a measurement report (e.g., including measurements received by the second MT function of the IAB node 320-*d*) to the network management function (e.g., via the first backhaul link to IAB node 320-*a*). That is, the MT functions of an IAB node may be in communication with each other (e.g., the first MT function of IAB node 320-*d* may pass the measurement configuration to the second MT function of IAB node 320-*d*, and the second MT function of IAB node 320-*d* may pass the measurement results, or measurement report, back to the first MT function of IAB node 320-*d* (e.g., for the first MT function to transmit to the network management function).

The network management function may then select a second parent node (e.g., for a second backhaul link with the second MT function of IAB node 320-*d*) based on the received measurement report. The network management function may transmit a configuration for a second link to the second MT to IAB node 320-*d* over the first backhaul link (e.g., via the first MT of IAB node 320-*d*). The second MT of IAB node 320-*d* may then establish a second backhaul link (e.g., to the network management function through IAB node 320-*c*) based on the received backhaul link configuration.

In other examples, MT functions of IAB nodes may establish links with parent nodes autonomously (e.g., according to IAB node settings, without configuration from a parent node or network management function, etc.). In such cases, a first MT function of a relay IAB node (e.g., relay IAB node 320-*d*) may establish a first backhaul link with a first parent (e.g., IAB node 320-*a*) and may establish a relay identifier (e.g., an identifier of the relay IAB node 320-*d*) with the network management function (e.g., through the first backhaul link). A second MT function of the relay IAB node 320-*d* may conduct signal strength measurements of other parent nodes (e.g., DU 315-*a*, IAB node 320-*b*, IAB node 320-*c*, etc.) and select a second parent node (e.g., IAB node 320-c) based on a parent-selection policy (e.g., criteria of the IAB node 320-a for parent selection, such as the strongest detected parent node, a parent node with a signal strength above a threshold, etc.). The IAB node 320-d may then connect to the second parent node, IAB node 320-c, and transmit the relay identifier to the network management function through the second backhaul link to IAB node 320-c. As such, the network management function may associate the second MT function with the same relay node as the first MT function (e.g., by comparing the relay identifiers received over each backhaul link, identifying the two relay identifiers are associated with a single relay node, etc.). The network management function may then transmit (e.g., via the first backhaul link to the first MT function) a configuration for the second link from a second MT function to a second parent (IAB node 320-c). The second MT function may establish the second link and use it for backhauling (e.g., in accordance with the backhaul link configuration).

Additional detail of the options for handling awareness and coordinated configuration of multi-MT relay nodes described above are discussed in more detail below. For example, in one scenario the management function may have explicit awareness and control over multi-MT operation (e.g., as described in more detail below with reference to FIGS. 4 and 5). In another scenario, the relay node may autonomously establish multi-MT connectivity based on preconfigured parent-selection policies (as described in more detail below with reference to FIGS. 6 and 7). In either case, the network management function may configure backhaul routes (e.g., backhaul links) and resource configuration across the redundant topology.

In either scenario (e.g., whether the management function has explicit awareness and control over multi-MT operation or the relay node autonomously establishes multi-MT connectivity), signaling messages between the MT functions of the relay node and the network management function (e.g., such as MT capability reports transmitted by a relay node, measurement configurations transmitted by a network management function, measurement reports transmitted by a relay node, backhaul link configurations transmitted by a network management function, etc.) may, in some cases, use RRC signaling. In some cases, signaling messages between the MT functions of the relay node and the network management function may use F1 protocol or non-access stratum (NAS) protocols. In some examples, the links may use cellular RATs (e.g., such as NR or LTE). In some examples, the relay node may also hold a full base station (e.g., a full gNB) rather than solely a DU (e.g., a gNB-DU). The relay node may also hold an eNB, or a DU of an eNB, which may be connected via the multi-hop wireless backhaul with a CU of an eNB. In some cases, the wireless links between relay node and parent nodes may include a RLC channel. The RLC channel may include an adaptation layer, which may be used, for example, for routing.

In some examples, any communication between the network management function and a second MT of the relay node via the first MT of the relay node may occur via a container (e.g., or field) inserted into a message between the network management function and the first MT. In some cases, communication between the network management function and a second MT of the relay node via the first MT (e.g., the container) may include an identifier of the second MT. In some cases, the configuration of routes, route utilization, link utilization, and resource allocation among multiple upstream links supported by a relay node may be decided and configured by the network management function. The network management function may be a part of a gNB, gNB-CU, eNB, eNB-CU, or a core network (e.g., such as an EPC or NGC). In some cases, the network management function may be collocated with these nodes or functions. In some cases, the network management function may have an interface to these nodes or functions. In some cases, the interface to these nodes or functions may be transparent to the MTs communicating with the network management function.

Figure 4:
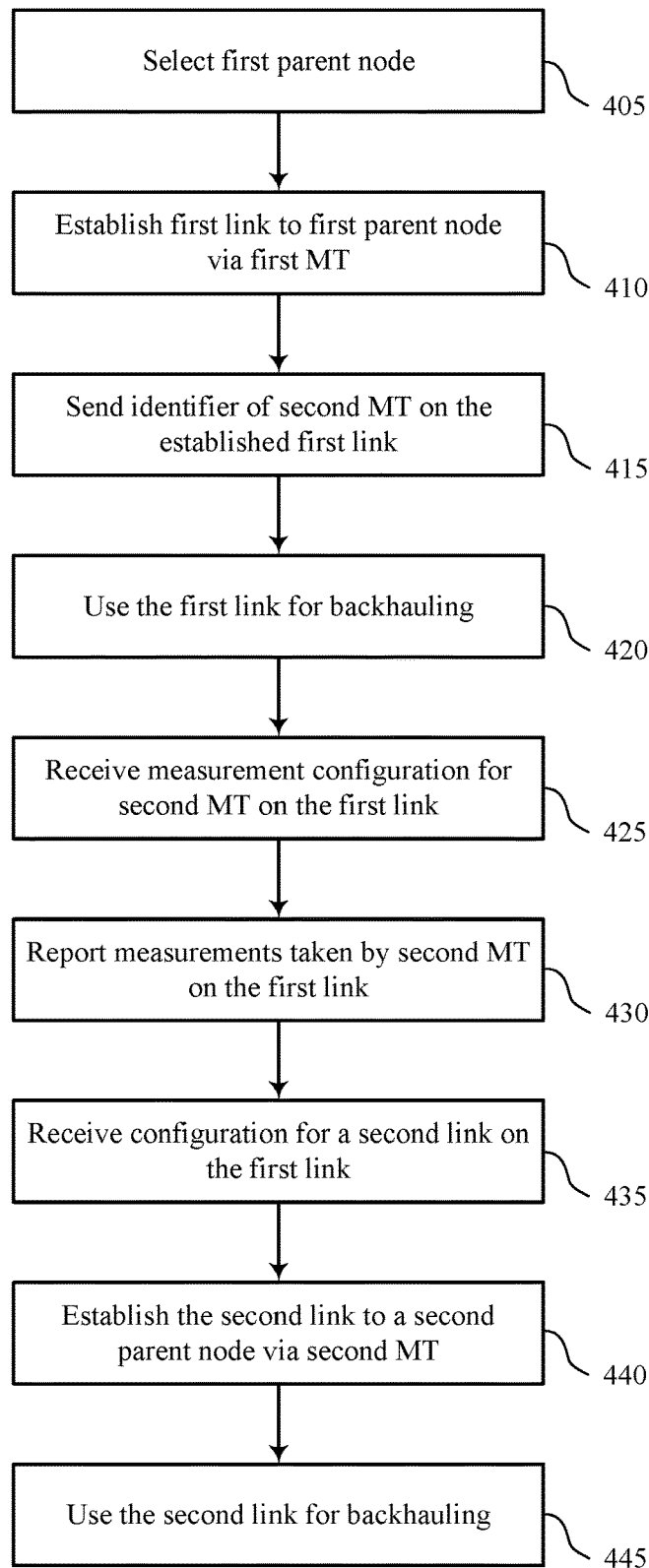
FIG. 4 illustrates an example of a flowchart that supports relay node with multi-connected cellular backhaul in accordance with one or more aspects of the present disclosure.

FIG. 4 illustrates an example of a flowchart 400 that supports relay nodes with multi-connected cellular backhaul in accordance with one or more aspects of the present disclosure. In some examples, flowchart 400 may implement aspects of wireless communications system 100, wireless communications system 200, and/or wireless communications system 300. For example, flowchart 400 may illustrate operations of a network management function and a relay node (e.g., an intermediary IAB node), as described with reference to FIGS. 1 through 3. Specifically, flowchart 400 may illustrate a network management function having explicit awareness and control over multi-MT operation. As discussed, mechanisms for performing one or more processes of the described techniques may be performed by a network management function, as well as a first MT function or first MT entity (e.g., a UEF) and a second MT function or second MT entity of a relay node. However, the described techniques may be extended to additional MT functions supported by a relay node by analogy, without departing from the scope of the present disclosure.

At 405, a relay node may, using a first MT function, select a first parent node (e.g., a parent relay node, a DU of a donor node, etc.) based on a parent selection policy. For example, the parent selection policy may be identified in system information, may be preconfigured on the relay node, etc. In some cases, the relay node may connect to the network once to retrieve the parent selection policies from operations, administration, and maintenance (OAM) functions, or other sources.

At 410, the first MT function of the relay node may establish a first link (e.g., a first backhaul link) to the selected parent node.

At 415, the first MT function may transmit a signaling message to the network management function. The message may include a relay identifier (e.g., an identification of the relay node) and list of MT-identifiers of MTs supported by the relay node (e.g., identification(s) of one or more of the supported MT functions). As such, each MT may be individually addressed by the management function. Alternatively, the first MT may send a relay identifier and the number of MTs supported. In this case, the relay identifier along with the MT index may allow for the network management function to still uniquely identify the MTs (e.g., using a combination of the relay identifier and the MT index). In some cases, the relay identifier may be assigned by the network (e.g., by the network management function), and the MT may provide the number of MTs supported.

The first MT may provide details on the capabilities of each MT (e.g., RATs, frequency bands, power class, angular coverage range in azimuth and elevation direction, number of antenna panels supported, etc.). For example, the first MT may transmit a capability report (e.g., including capabilities of each supported MT function) to the network management function via the first backhaul link. Such may enable the network management function to process and understand the limitations of the relay node for multi-MT operation. In some cases, the first MT may further provide details on inter-MT relation (e.g., such as inter-MT antenna isolation, azimuth or elevation range overlap, etc.). In some cases, the first MT may further provide details on the number of DUs supported by the relay, may provide relation between MTs and DUs (e.g., if an MT shares an antenna panel with a DU), etc. The first MT may provide some or all of such information, for example, via RRC to the network management function.

At 420, the relay node may use the first wireless link for backhauling access or backhaul traffic of collocated DUs.

At 425, the network management function may decide to activate an additional MT function (e.g., a second MT function) of the relay node and may select a parent of the second MT function. The network management function may convey such to the relay node by transmitting a measurement configuration message to the first MT, which may define measurement events to be reported by the second MT (e.g., to the network management function via the first MT of the relay node). The measurement configuration message may specify a measurement configuration explicitly for a specific MT (e.g., by including an MT identifier or MT index in the configuration). Alternatively, configurations may implicitly apply to all or a subset of the MTs supported by the relay node. The subset of MTs may also, in some cases, be specified in the configuration message.

At 430, the second MT may conduct measurements based on the measurement configuration and upon an event trigger. The first MT may report the measurements (e.g., performed by the second MT) to the management function (e.g., to the gNB-CU) while indicating the second MT has conducted the measurement. In some cases, the measurement configuration may be transmitted via RRC.

At 435, the network management function may (e.g., based on the measurement report) decide to activate the second MT and may select a second parent relay, under the control of the network management function, for the second MT. The network management function may transmit a signaling message (e.g., a backhaul link configuration message) to the first MT with a configuration for the second MT. The configuration for the second MT may include an identifier for the second MT, as well as other link and route configuration information for the second MT. In some cases, the configuration may use RRC (e.g., the backhaul link configuration may be transmitted in a RRC Reconfiguration message).

At 440, the second MT may establish a link as specified in the backhaul link configuration message. In some cases, as part of the link establishment, the second MT may authenticate at the network. The second MT may further report capabilities in the same or similar manner as the first MT reported its capabilities.

At 445, based on the backhaul link configuration, the relay node may then use the second wireless link for backhauling of access or backhaul traffic of collocated DUs, or it may further use both wireless links simultaneously for the backhauling of access or backhaul traffic of collocated DUs. The backhaul link configuration may further specify for the relay node to use the first link for one subset of collocated DUs and the other link for another subset of collocated DUs.

Figure 5:
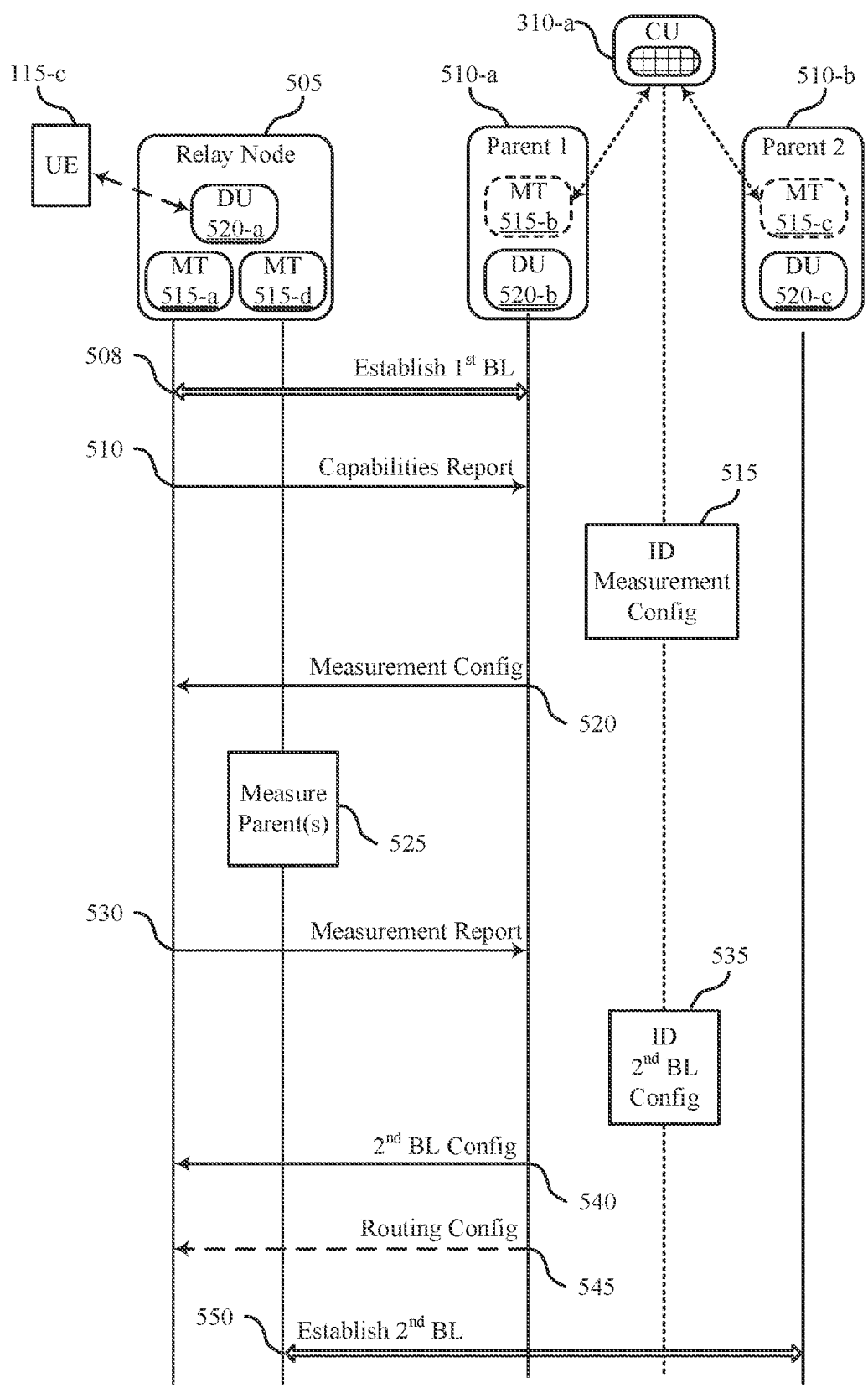
FIG. 5 illustrates an example of a process flow that supports relay node with multi-connected cellular backhaul in accordance with one or more aspects of the present disclosure.

FIG. 5 illustrates an example of a process flow 500 that supports relay nodes with multi-connected cellular backhaul in accordance with one or more aspects of the present disclosure. In some examples, process flow 500 may implement aspects of wireless communications system 100, wireless communications system 200, and/or wireless communications system 300. For example, process flow 500 may include a relay node 505, a parent node 510-a, a parent node 510-b, and a CU 310-a, which may be examples of corresponding functionality of an IAB network architecture (e.g., such as a network device 105 or base station 105, relay node 320, DU 315, CU 310), as described with reference to FIGS. 1 through 4. Process flow 500 may illustrate a network management function becoming aware of multi-MT support by a relay node (e.g., relay node 505), as well as network management function control over multi-MT operation (e.g., operation of MT 515-a and MT 515-d). In the following description of the process flow 500, the operations between the relay node 505, parent nodes 510, and a network management function (e.g., CU 310-a, or some network management function or network management function entity in communication with CU 310-a) may be transmitted in a different order than the exemplary order shown, or the operations performed by relay node 505, parent node 510-a, parent node 510-b, and the network management function may be performed in different orders or at different times. In some cases, certain operations may also be left out of the process flow 500, or other operations may be added to the process flow 500.

Process flow 500 may illustrate a relay node 505 in communication with a network management function via a first wireless backhaul link between a first MT function (e.g., MT 515-a) and a first parent or control node (e.g., parent node 510-a). Process flow 500 further illustrates network management function configuration of a second wireless backhaul link (e.g., using the multiple MT functionality of the relay node 505) between a second MT function (e.g., MT 515-d) and a second parent or control node (e.g., parent node 510-b). That is, parent node 510-a and parent node 510-b may each refer to either a parent relay node (e.g., which may include both MT functionality and a DU 520) or a donor node (e.g., which may include a DU 520 and may be directly connected to CU 310-a, or in some cases may include CU 310-a). In cases where parent node 510-a and/or parent node 510-b refer to a parent relay node, the parent relay node may include MT functionality that may further relay to, or serve as a midpoint in the link to, a donor node. That is, parent node 510-a and parent node 510-b may each refer to a parent node of relay node 505, and may refer to a parent relay node or a donor node, as described herein, and may each provide a link from relay node 505 to a network management function (e.g., CU 310-a).

DU 520-a associated with a relay node 505 may be partially controlled and/or scheduled by MT 515-a and/or MT 515-d. DU 520-a may host lower layer, such as L1 and L2 (e.g., RLC, MAC, PHY, etc.), functionality and signaling. Relay node 505 may be a descendant (e.g., child) node relative to parent node 510-a and parent node 510-b along two different paths within the relay chain. Further, relay node 505 may include MT 515-a, which may be controlled and/or scheduled by DU 520-b of parent node 510-a via access and backhaul links of the IAB network, and may further include MT 515-d, which may be controlled and/or scheduled by DU 520-c of parent node 510-b via access and backhaul links of the IAB network. In addition, in some cases (e.g., when parent node 510-a and parent node 510-b are both parent relay nodes), DU 520-b and DU 520-c may be partially controlled and/or scheduled by signaling messages from a CU 310-a of an IAB donor (e.g., via an F1-AP). Parent node 510-a may support one or more wireless backhaul and/or access links within the relay chain, providing network services to one or more descendant devices throughout the network (e.g., such as relay node 505). Parent node 510-b may support one or more wireless backhaul and/or access links within the relay chain, providing network services to one or more descendant devices throughout the network (e.g., such as relay node 505).

At 508, relay node 505 may establish a first backhaul link (BL) between the first MT function (e.g., MT 515-*a*) and a first parent node (e.g., parent node 510-*a*). In some cases, the first backhaul link may be established based on the relay node 505 measuring, using the MT 515-*a*, one or more parent nodes, and selecting parent node 510-*a* based on a parent-selection policy. The first backhaul link may connect relay node 505 (e.g., specifically MT 515-*a*) to a network management function (e.g., CU 310-*a*) through parent node 510-*a*. As discussed above, in some cases, parent node 510-*a* may be a parent relay node, or a DU associated with a donor node. That is, parent node 510-*a* may generally refer to a first node, in communication with relay node 505, under the control of the management control function, or CU 310-*a*.

At 510, relay node 505 may transmit, via the first backhaul link using MT 515-*a*, a capability report to the network management function. The capability report may include capabilities of the relay node in terms of MT functionality (e.g., a number of MT functions supported, identifiers of the MTs supported, isolation between different MT functions, etc.) as well as capabilities of individual MT functions (e.g., such as RATs supported by a second MT function, frequency bands supported by the second MT function, azimuth and elevation patterns supported by the second MT function, etc.). For example, the capability report may include an identifier of MT 515-*d*, one or more RATs supported by MT 515-*d*, one or more frequency bands supported by MT 515-*d*, azimuth and elevation patterns supported by MT 515-*d*, RF capabilities of MT 515-*d*, isolation between MT 515-*a* and MT 515-*d*, an identifier of the relay node 505, a list of supported MT functions (e.g., identifiers of MT 515-*a*, MT 515-*d*, and any other MTs supported by relay node 505), etc.

At 515, the network management function may identify a measurement configuration for MT 515-*d* based on the received capability report. For example, the network management function may consider the capabilities of relay node 505 (e.g., and MT 515-*d*) and may identify parent nodes (e.g., parent node 510-*b*) for the MT 515-*d* to measure. In general, the measurement configuration may include identification of MT functions to perform measurements, identification of parent nodes to be measured, identification of measurements to be taken (e.g., RSSI measurements, RSRP measurements, etc.), etc. For example, in cases where relay node 505 indicates several MT functions (e.g., more than two MT functions) in the capability report, the measurement configuration may identify parent nodes to be measured and measurements to be received by more than one MT. The measurement configuration may indicate (e.g., via an MT identifier, that may have been included in the capability report) which MT functions are to perform measurements, which measurement are to be performed, which parent nodes each MT function should measure, etc.

At 520, the network management function may transmit, via the first backhaul link, the identified measurement configuration to the MT 515-*a*.

At 525, the relay node may perform, using MT 515-*d*, one or more measurements of parent node 510-*b* according to the measurement report received at 520. For example, MT 515-*a* may receive the measurement configuration and may pass the measurement configuration to MT 515-*d* (e.g., as the MT 515-*a* and MT 515-*d* may be connected and in communication within the relay node 505). The relay node 505 may thus perform, using MT 515-*d*, measurements of parent node 510-*b* based at least in part on the measurement configuration.

At 530, the relay node may transmit a measurement report, including the measurement information received by MT 515-*d*, to the network management functions via the first backhaul link to parent node 510-*a*. For example, MT 515-*d* may perform measurements and pass measurement reporting information to MT 515-*a* (e.g., as the MT 515-*d* and MT 515-*a* may be connected and in communication within the relay node 505), and the MT 515-*a* may transmit the measurement report to parent node 510-*a*.

At 535, the network management function may identify a backhaul link configuration (e.g., for the relay node 505 via MT 515-*d*) based at least in part on the measurement report received at 530. For example, the network management function may identify which parent node(s) additional MTs of the relay node should connect to, whether the additional backhaul links will be operated in parallel with the first backhaul link, as a backup to the first backhaul link, etc. In some cases, the network management function may determine second backhaul link route utilization information, second backhaul link utilization information, second backhaul link resource allocation information, etc. based on the received measurement report.

At 540, the network management function may transmit, via the first backhaul link, the identified backhaul link configuration for the MT 515-*d* to the MT 515-*a* (e.g., via parent node 510-*a*). In some cases, the backhaul link configuration may include information regarding second backhaul link establishment and operation (e.g., identification of a second parent node to connect to, route utilization information, link utilization information, resource allocation information, etc.).

At 545, the network management function may optionally transmit a routing configuration, indicating how the first backhaul link and the second backhaul link should be used (e.g., in parallel, as primary and backup backhaul links, etc.). In some cases, the routing configuration information may be included in the backhaul link configuration transmitted at 540 (e.g., in some cases, the information of 545 may be included in 540, and not as a separate message or transmission).

At 550, MT 515-*d* may establish a second backhaul link between the second MT function (e.g., MT 515-*d*) and the second parent node (e.g., parent node 510-*b*). The second backhaul link may connect relay node 505 (e.g., specifically MT 515-*d*) to a network management function (e.g., CU 310-*a*) through parent node 510-*b*. As discussed above, in some cases parent node 510-*b* may be a parent relay node, or a DU associated with a donor node. That is, parent node 510-*b* may generally refer to a first node, in communication with relay node 505, under the control of the management control function, or CU 310-*a*.

As such, relay node 505 may operate in a multi-connected cellular backhaul state (e.g., with multiple backhaul connections to the network management function). The network management function may coordinate the multiple backhaul links associated with relay node 505. For example, a routing configuration (e.g., of 545) may update or reconfigure the first and/or second backhaul link such that the usage of one or both of the first and second backhaul links may be dynamically adjusted by the network management function (e.g., according to changing conditions of the backhaul links, changing conditions of the amount or priority of backhaul traffic, etc.).

Figure 6:
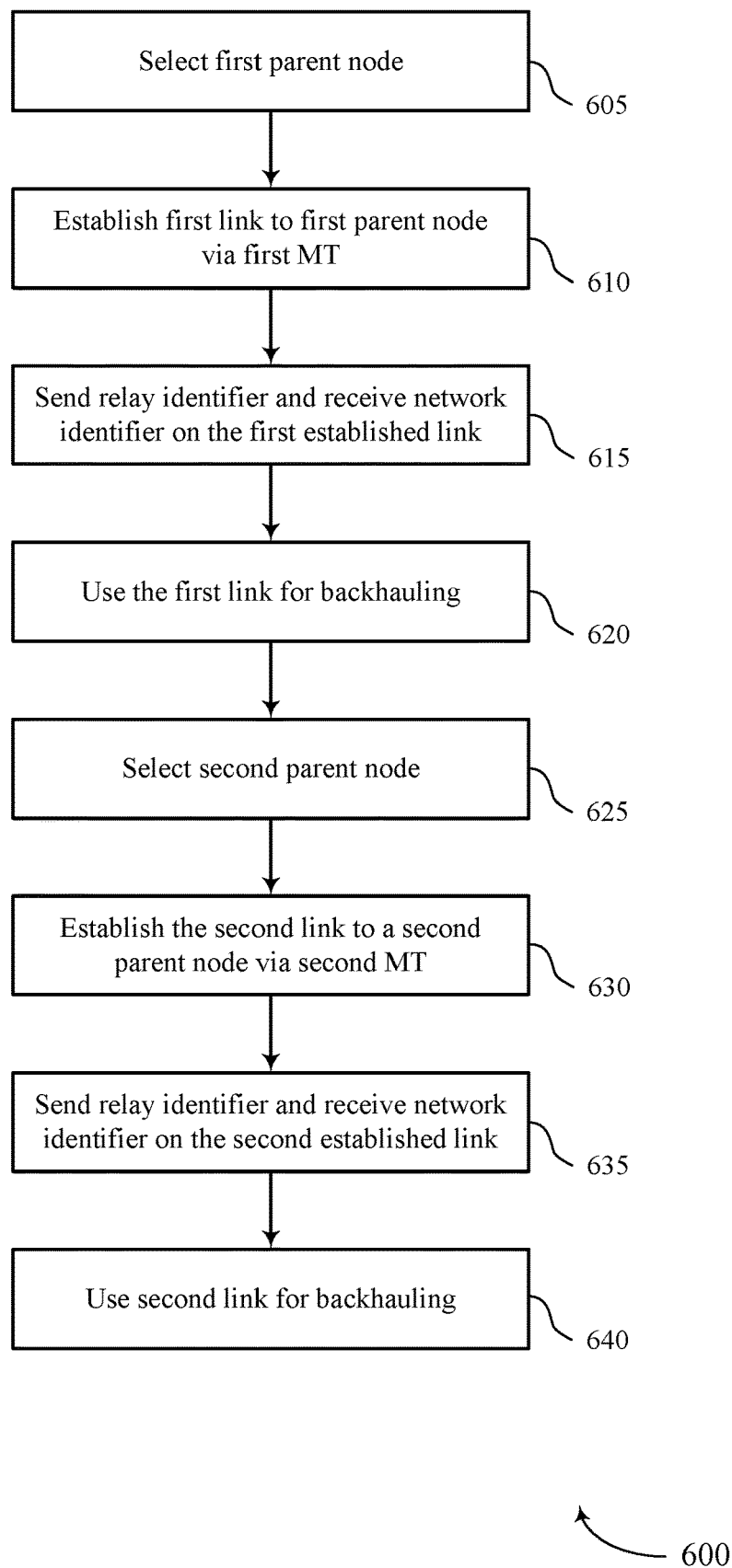
FIG. 6 illustrates an example of a flowchart that supports relay node with multi-connected cellular backhaul in accordance with one or more aspects of the present disclosure.

FIG. 6 illustrates an example of a flowchart 600 that supports relay nodes with multi-connected cellular backhaul in accordance with one or more aspects of the present disclosure. In some examples, flowchart 600 may implement aspects of wireless communications system 100, wireless communications system 200, and/or wireless communications system 300. For example, flowchart 600 may illustrate operations of a network management function and a relay node (e.g., an intermediary IAB node), as described with reference to FIGS. 1 through 3. Specifically, flowchart 600 may illustrate autonomous establishment of multi-MT connectivity based on preconfigured parent-selection policies, and network management function coordinated backhaul configuration (e.g., in cases where multiple MT functions associated with a same relay node autonomously connect to a same network management function over two or more backhaul links). As described, mechanisms for performing one or more processes of the described techniques may be performed by a network management function, as well as a first MT function or first MT entity (e.g., a UEF) and a second MT function or second MT entity of a relay node. However, the described techniques may be extended to additional MT functions supported by a relay node by analogy, without departing from the scope of the present disclosure.

At 605, a relay node may, using a first MT function, select a first parent node (e.g., a parent relay node, a DU of a donor node, etc.) based on a parent selection policy. For example, the relay node may identify the parent selection policy in system information. In other cases, the parent selection policy may be preconfigured. In some cases, the relay node may connect to the network once to retrieve the parent selection policies from OAM functions, or other sources.

At 610, the first MT function of the relay node may establish a first link (e.g., a first backhaul link) to the selected parent.

At 615, the first MT function of the relay node may send a relay identifier (e.g., an identifier of the relay node) to the network management function during the link establishment procedure. In some cases, the relay identifier may be provided by the network (e.g., the network management function may establish the relay identifier, and may inform the relay node of its relay identifier during the link establishment procedure). In some examples, the first MT may further transmit capabilities of additional MTs (e.g., in a capabilities report including a number of MTs supported, capabilities of the MTs, etc., as described herein) of the relay node to the network management function. In some cases, the relay identifier and/or the capabilities report may be transmitted using an RRC message. In some cases, the first MT function may receive, from the network management function, a policy or a request for the activation of further MTs.

At 620, The relay node may use the established first wireless link for the backhauling of access of backhaul traffic of collocated DUs.

At 625, using a second MT function, the relay node may measure and select a second parent relay node (e.g., based on parent-selection policies). The relay node may then establish a second backhaul link with the selected parent node. In some cases, the measurements (e.g., and selection) may be based on signal strength (e.g., of measurements associated with the different parent nodes). In some cases, the parent-selection policies used by the second MT function may be different than parent-selection policies used by the first MT.

At 630, The second MT function of the relay node may establish a second backhaul link to the selected parent node.

At 635, during the link establishment procedure, the second MT function may send the relay identifier to the network management function (e.g., the resource management function). In some cases, the second MT function may transmit the relay identifier using RRC signaling.

If the same network management function supports both parents, the network management function may derive or identify that the first MT and second MT reside on the same relay node, and may further identify that the relay node is thus dual-connected. For example, the network management function may receive the relay identifier, from the first MT function, over the first backhaul link and may also receive the relay identifier, from the second MT function, over the second backhaul link. As such, the network management function may determine that the two received relay identifiers are associated with the same relay node, and that the relay node is thus dual-connected, via two MT functions of the relay node, over two backhaul links to the network management function.

The network management function may therefore be capable of performing further configuration operations for each MT function of the relay node. For example, the network management function may configure which MT function of the relay node carries traffic, whether the two backhaul links are to be used in parallel, whether one backhaul link is to be reserved as a backup backhaul link, etc. In some cases, each MT function may (e.g., at 610 and 630) send their respective MT identifiers during link establishment. In such cases, the network management function may include an identifier of the MT function, of which it is configuring, in the configuration sent to the MT. As such, for example, the network management function may transmit a configuration for the second MT (e.g., by including the second MT function identifier in the backhaul link configuration message) over the first link, and the relay node may identify the backhaul link configuration is for the second MT function.

In scenarios where different network management functions support the two parent nodes (e.g., different management functions support the first and second parent nodes that the relay node autonomously connected to), each of the network management functions may consider the relay node single-connected. As such, each of the network management functions may perform further configuration operations for one of the two MT functions. To avoid conflicting configuration, such as same resource assignment for both links, the MT function may provide different capabilities (e.g., such as different bands supported) on each link. In some cases, the MT may also use one of the links as a backup link only. Further, the relay node may also identify or differentiate if the MT functions are connected to the same or different network management functions (e.g., if the two parent nodes that the relay node's two MT functions are connected to are supported by the same or different network management functions). For this purpose, the topology and resource management function may provide its own identifier (e.g., a network management function identifier or a network identifier) to each respective MT function of the relay node. The relay node may then compare the network management function identifiers received over each of its MT functions, and identify or determine whether the relay node is dual-connected to a single network management function (e.g., if the network identifiers indicate a same network management function) or single-connected to two network management functions (e.g., if the network identifiers indicate different network management functions).

At 640, based on configuration received at 635, the relay node may then use the second wireless link for the backhauling of access traffic or backhaul traffic of collocated DUs, or the relay node may use both wireless links simultaneously (e.g., in parallel) for the backhauling of access or backhaul traffic of collocated DUs. In some cases, the configuration may further specify whether the relay node is to use the first link for one subset of collocated DUs and the other link for another subset of collocated DUs (e.g., in some cases, the configuration may divide backhauling over the two backhaul links by assigning backhaul of certain collocated DUs to each link).

Figure 7:
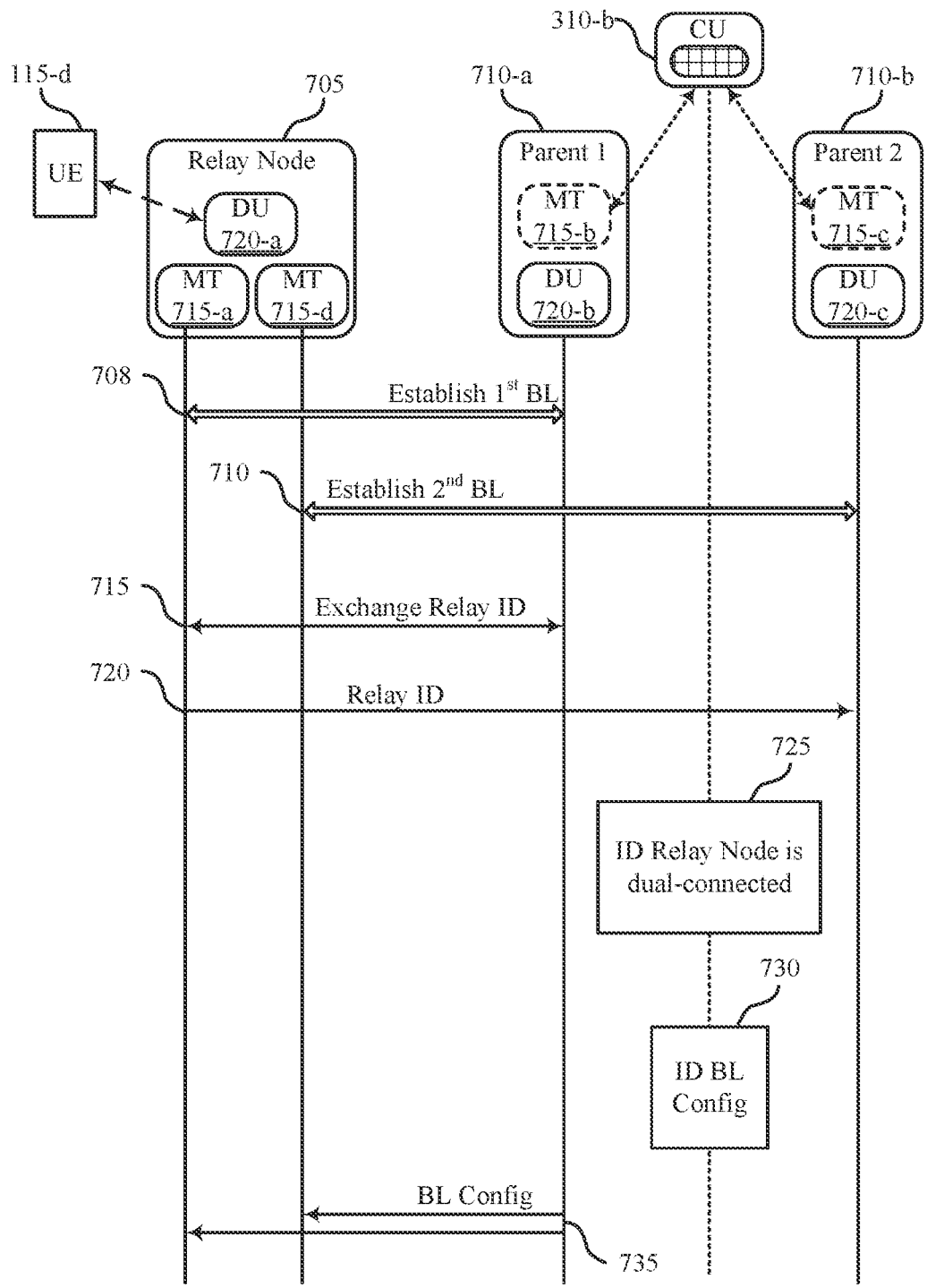
FIG. 7 illustrates an example of a process flow that supports relay node with multi-connected cellular backhaul in accordance with one or more aspects of the present disclosure.

FIG. 7 illustrates an example of a process flow 700 that supports relay nodes with multi-connected cellular backhaul in accordance with one or more aspects of the present disclosure. In some examples, process flow 700 may implement aspects of wireless communications system 100, wireless communications system 200, and/or wireless communications system 300. For example, process flow 700 may include a relay node 705, a parent node 710-$a$, a parent node 710-$b$, and a CU 310-$b$, which may be examples of corresponding functionality of an IAB network architecture (e.g., such as a network device 105 or a base station 105, relay node 320, DU 315, CU 310), as described with reference to FIGS. 1 through 4. Process flow 700 may illustrate a network management function becoming aware of multi-MT support by a relay node, as well as network management function control over multi-MT operation. In the following description of the process flow 700, the operations between the relay node 705, parent nodes 710, and a network management function (e.g., CU 310-$a$, or some network management function or network management function entity in communication with CU 310-$a$) may be transmitted in a different order than the exemplary order shown, or the operations performed by relay node 705, parent node 710-$a$, parent node 710-$b$, and the network management function may be performed in different orders or at different times. In some cases, certain operations may also be left out of the process flow 700, or other operations may be added to the process flow 700.

At 708, relay node 705 may (e.g., autonomously) establish a first backhaul link between the first MT function (e.g., MT 715-$a$) and a first parent node (e.g., parent node 710-$a$). In some cases, the first backhaul link may be established based on the relay node 705 measuring, using the MT 715-$a$, one or more parent nodes, and selecting parent node 710-$a$ based on a parent-selection policy. The first backhaul link may connect relay node 705 (e.g., specifically MT 715-$a$) to a network management function (e.g., CU 310-$b$) through parent node 710-$a$. As discussed above, in some cases parent node 710-$a$ may be a parent relay node or a DU associated with a donor node. That is, parent node 710-$a$ may generally refer to a first node, in communication with relay node 705, under the control of the network management function (e.g., management control function), or CU 310-$b$.

At 710, relay node 705 may (e.g., autonomously) establish a second backhaul link between the second MT function (e.g., MT 715-$d$) and a second parent node (e.g., parent node 710-$b$). In some cases, the second backhaul link may be established based on the relay node 705 measuring, using the MT 715-$d$, one or more parent nodes, and selecting parent node 710-$b$ based on a parent-selection policy (e.g., which may be the same parent-selection policy or a different parent-selection policy used by MT 715-$a$). The second backhaul link may connect relay node 705 (e.g., specifically MT 715-$d$) to a network management function (e.g., CU 310-$b$) through parent node 710-$b$. As discussed above, in some cases parent node 710-$b$ may be a parent relay node, or a DU associated with a donor node. That is, parent node 710-$b$ may generally refer to a second node, in communication with relay node 705, under the control of the management control function, or CU 310-$b$.

At 715, the relay node 705 may exchange an identifier of the relay node, using MT 715-$a$, with the network management function. In some cases, the network management function may generate a relay identifier for the relay node 705 (e.g., during link establishment at 708) and may transmit the relay identifier to the MT 715-$a$. In other cases, relay node 705 may identify a relay identifier (e.g., based on a node identification number) and transmit the relay identifier to the network management function (e.g., via the first backhaul link to parent node 710-$a$).

At 720, relay node 705 may then, using MT 715-$d$, transmit the relay identifier (e.g., identified or received at 715) to the network management function via the second backhaul link to parent node 710-$b$.

At 725, the network management function may receive the relay identifier over the two links (e.g., from parent node 710-$a$ and parent node 710-$b$) and may identify the relay node 705 is dual-connected to the network management function (e.g., the network management function may identify the two relay identifiers received over the two links are associated with the same relay node 705 and may deduce that relay node 705 is dual-connected to the network management function.

At 730, the network management function may coordinate use of the first and second backhaul links based on the identification that the relay node 705 is dual-connected to the network management function. For example, the network management function may identify a backhaul link configuration for the second connected MT (e.g., MT 715-$d$).

At 735, the network management function may transmit a backhaul link configuration to the MT 715-$d$ over the second link, or may transmit a backhaul link configuration for the MT 715-$d$ over the first link to MT 715-$a$, where the backhaul link configuration includes an identifier of the MT 715-$d$ (e.g., such that MT 715-$a$ knows the backhaul link configuration applies to MT 715-$d$, and forwards the backhaul link configuration to MT 715-$d$). In some cases, the first backhaul link may be additionally or alternatively configured at 730 and 735. In general, the network management function may coordinate configuration of the first and second backhaul links upon determination that the relay node 705 is dual-connected to the network management function.

Figure 8:
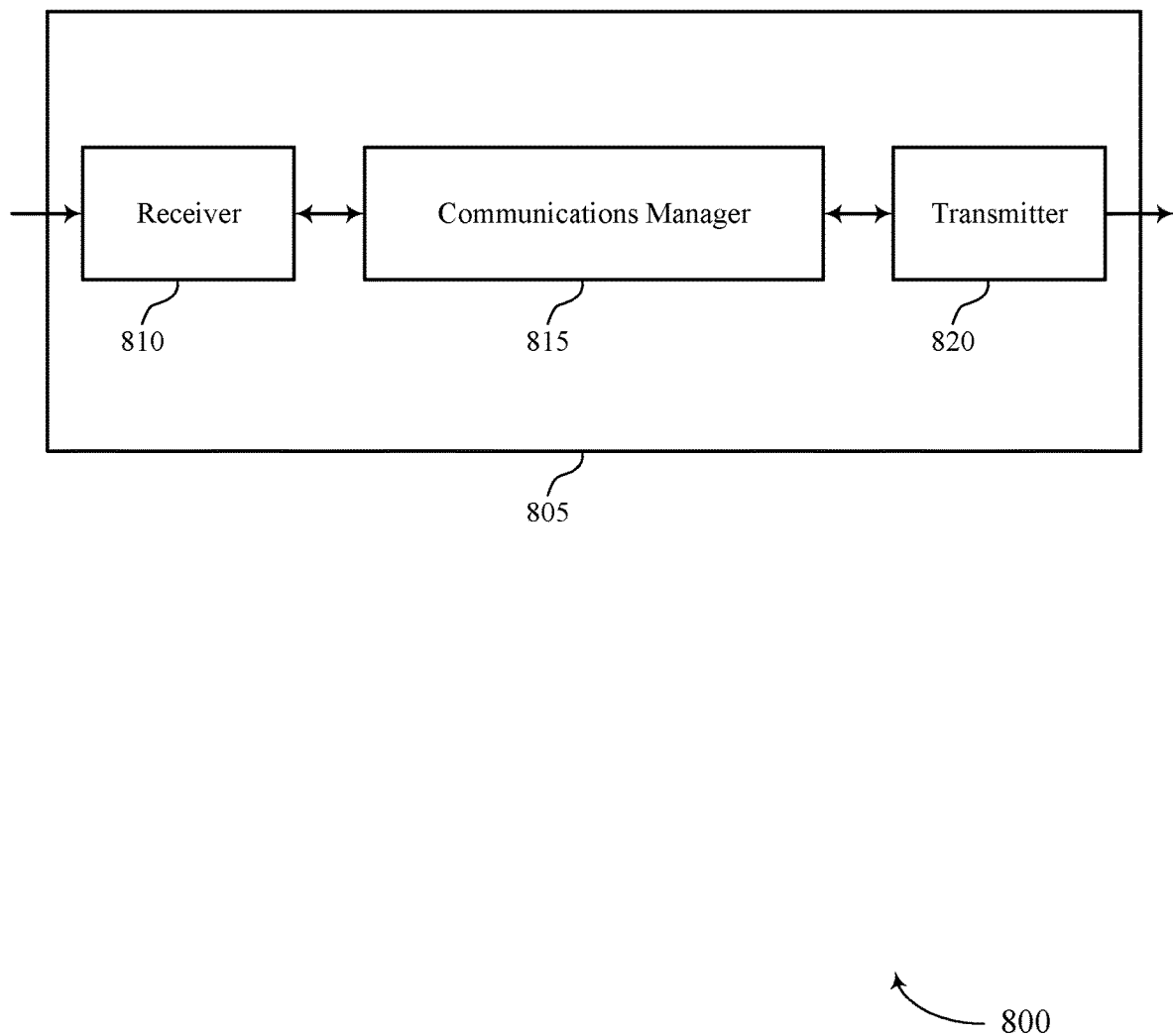
FIGS. 8 and 9 show block diagrams of devices that support relay nodes with multi-connected cellular backhaul in accordance with one or more aspects of the present disclosure.

FIG. 8 shows a block diagram 800 of a device 805 that supports relay nodes with multi-connected cellular backhaul in accordance with one or more aspects of the present disclosure. The device 805 may be an example of aspects of a relay node (e.g., such as a relay network device 105 or a relay base station 105, a relay IAB node 320, relay node 505, relay node 705) as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to relay nodes with multi-connected cellular backhaul, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, using a first mobile terminal function of the relay node, a measurement report to a network management function via a first backhaul link to a first parent node, where the measurement report includes measurements of a second parent node transmission. The communications manager 815 may receive, via the first backhaul link using the first mobile terminal function of the relay node, a backhaul link configuration for the second mobile terminal function based on the transmitted measurement report. The communications manager 815 may establish a second backhaul link between the second mobile terminal function of the relay node and the second parent node based on the received backhaul link configuration.

The communications manager 815 may also exchange, using a first mobile terminal function of the relay node, an identifier of the relay node with a first network management function via a first backhaul link to a first parent node. The communications manager 815 may transmit, using a second mobile terminal function of the relay node, the identifier of the relay node to a second network management function via a second backhaul link to a second parent node. The communications manager 815 may receive a backhaul link configuration for the second mobile terminal function based on the transmission of the identifier of the relay node to the first network management function via the first backhaul link and the transmission of the identifier of the relay node to the second network management function via the second backhaul link. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
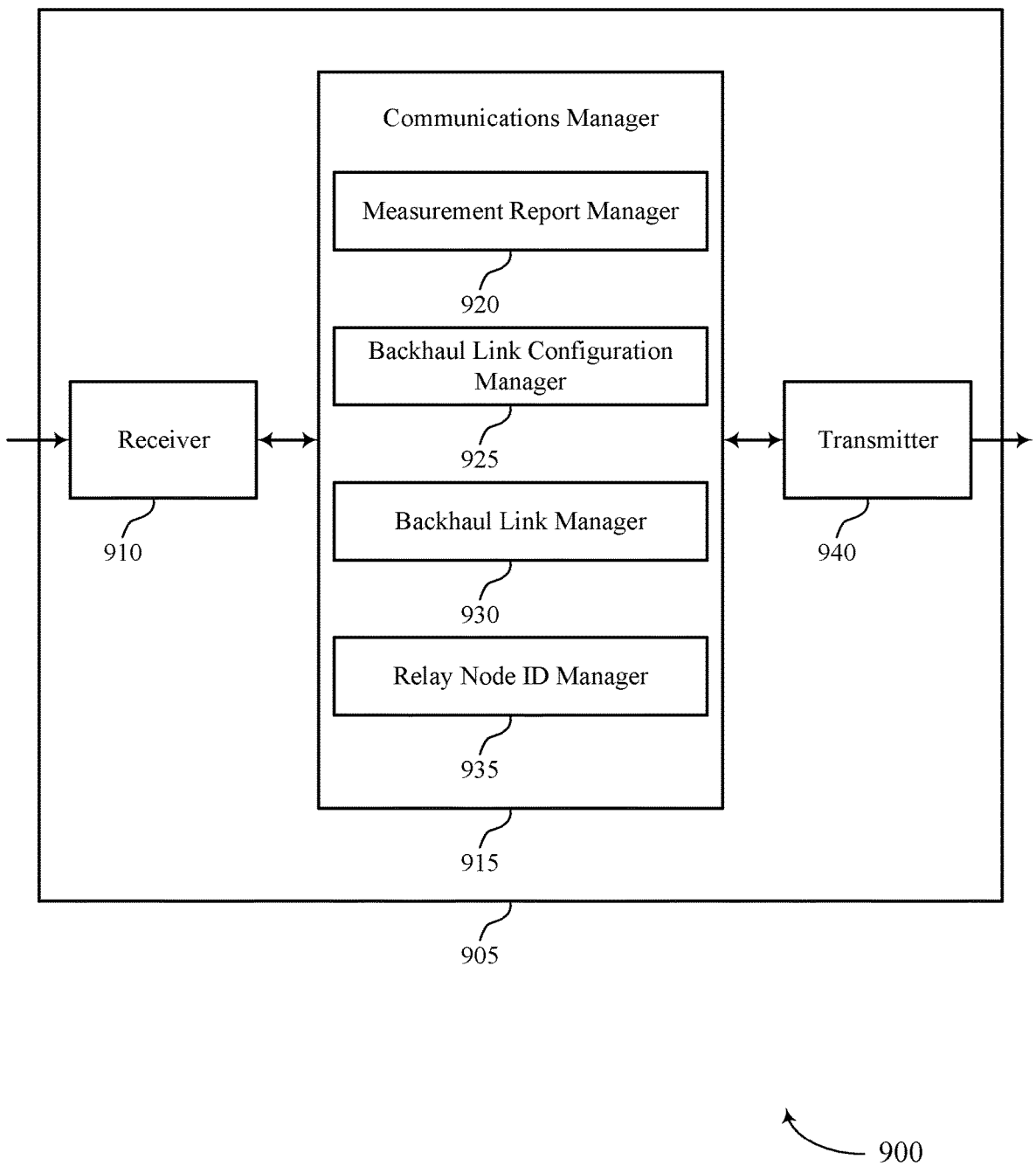

FIG. 9 shows a block diagram 900 of a device 905 that supports relay nodes with multi-connected cellular backhaul in accordance with one or more aspects of the present disclosure. The device 905 may be an example of aspects of a device 805, or a relay node (e.g., such as a relay network device 105 or a relay base station 105, a relay IAB node 320, relay node 505, relay node 705) as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to relay nodes with multi-connected cellular backhaul, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a measurement report manager 920, a backhaul link configuration manager 925, a backhaul link manager 930, and a relay node ID manager 935. The communications manager 915 may be an example of aspects of the communications manager 1110 described herein.

The measurement report manager 920 may transmit, using a first mobile terminal function of the relay node, a measurement report to a network management function via a first backhaul link to a first parent node, where the measurement report includes measurements of a second parent node transmission.

The backhaul link configuration manager 925 may receive, via the first backhaul link using the first mobile terminal function of the relay node, a backhaul link configuration for the second mobile terminal function based on the transmitted measurement report.

The backhaul link manager 930 may establish a second backhaul link between the second mobile terminal function of the relay node and the second parent node based on the received backhaul link configuration.

The relay node ID manager 935 may exchange, using a first mobile terminal function of the relay node, an identifier of the relay node with a first network management function via a first backhaul link to a first parent node and transmit, using a second mobile terminal function of the relay node, the identifier of the relay node to a second network management function via a second backhaul link to a second parent node.

The backhaul link configuration manager 925 may receive a backhaul link configuration for the second mobile terminal function based on the transmission of the identifier of the relay node to the first network management function via the first backhaul link and the transmission of the identifier of the relay node to the second network management function via the second backhaul link.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
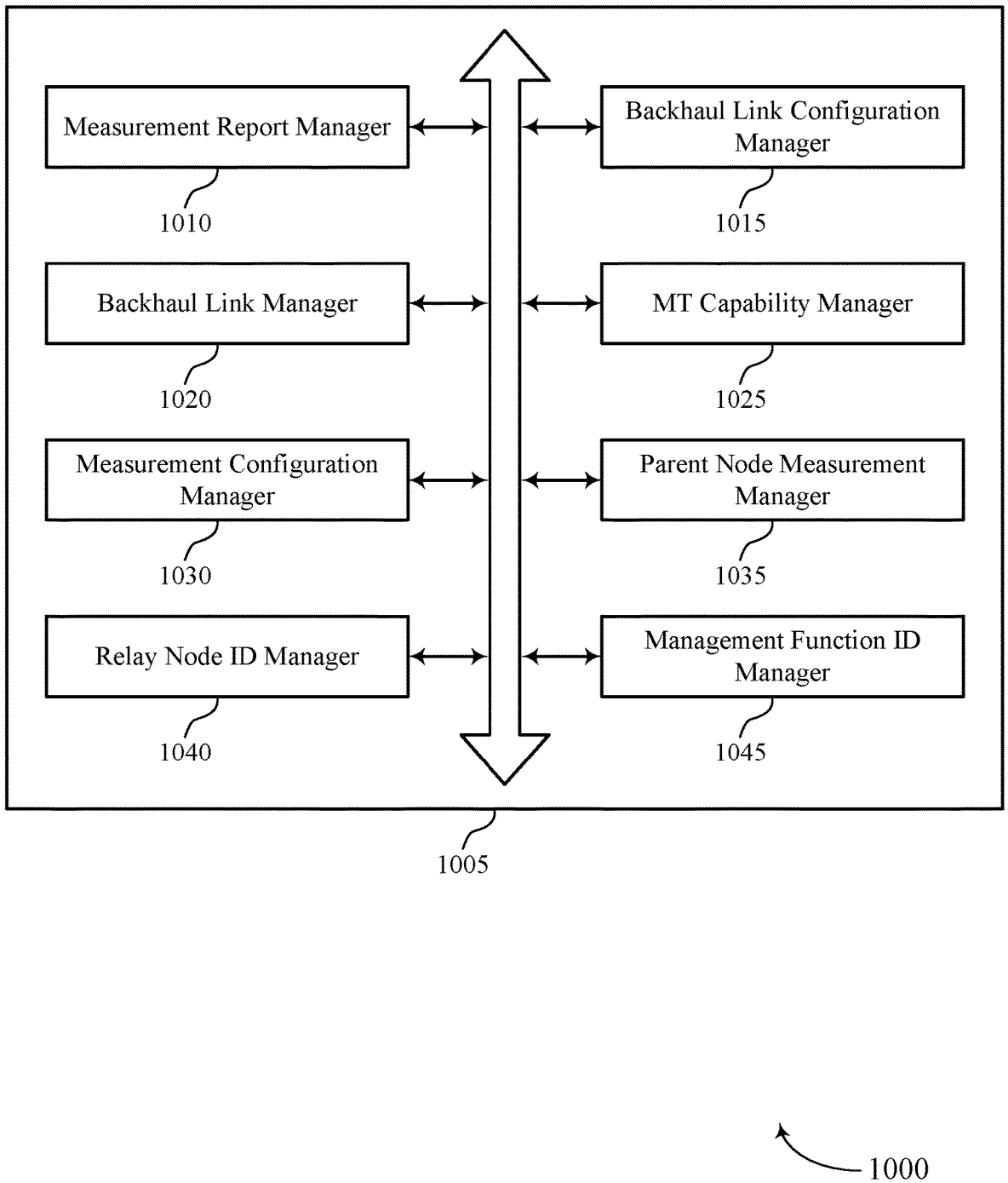
FIG. 10 shows a block diagram of a communications manager that supports relay nodes with multi-connected cellular backhaul in accordance with one or more aspects of the present disclosure.

FIG. 10 shows a block diagram 1000 of a communications manager 1005 that supports relay nodes with multi-connected cellular backhaul in accordance with one or more aspects of the present disclosure. The communications manager 1005 may be an example of aspects of a communications manager 815, a communications manager 915, or a communications manager 1110 described herein. The communications manager 1005 may include a measurement report manager 1010, a backhaul link configuration manager 1015, a backhaul link manager 1020, a MT capability manager 1025, a measurement configuration manager 1030, a parent node measurement manager 1035, a relay node ID manager 1040, and a management function ID manager 1045. Each of these modules may communicate, directly or indirectly, with one another (e.g., via one or more buses).

The measurement report manager 1010 may transmit, using a first mobile terminal function of the relay node, a measurement report to a network management function via a first backhaul link to a first parent node, where the measurement report includes measurements of a second parent node transmission.

The backhaul link configuration manager 1015 may receive, via the first backhaul link using the first mobile terminal function of the relay node, a backhaul link configuration for the second mobile terminal function based on the transmitted measurement report. In some examples, the backhaul link configuration manager 1015 may receive a backhaul link configuration for the second mobile terminal function based on the transmission of the identifier of the relay node to the first network management function via the first backhaul link and the transmission of the identifier of the relay node to the second network management function via the second backhaul link.

In some examples, receiving a routing configuration for the first backhaul link and the second backhaul link, where the routing configuration includes route utilization information, link utilization information, resource allocation information, or some combination thereof. In some cases, the backhaul link configuration for the second mobile terminal function includes an identifier of the second mobile terminal function of the relay node, an identifier of the second parent node, route configuration parameters, or some combination thereof. In some cases, the backhaul link configuration for the second mobile terminal function is received in a container of a RRC message received by the first mobile terminal function. In some cases, the backhaul link configuration for the second mobile terminal function is received in F1-AP signaling. In some cases, the first network management function and the second network management function each include a gNB, a gNB-CU, a gNB-CU-CP, an eNB, an eNB-CU, an eNB-CU-CP, a centralized controller, a topology function, a route function, a resource function, or some combination thereof.

The backhaul link manager 1020 may establish a second backhaul link between the second mobile terminal function of the relay node and the second parent node based on the received backhaul link configuration. In some examples, the backhaul link manager 1020 may exchange backhaul information with the first network management function via the first backhaul link to the first parent node using the first mobile terminal function, with the second network management function via the second backhaul link to the second parent node using the second mobile terminal function, or both, based on the received backhaul link configuration.

In some examples, the backhaul link manager 1020 may establish the first backhaul link between the first mobile terminal function of the relay node and the first parent node, where the identifier of the relay node is transmitted to the first network management function via the established first backhaul link. In some examples, the backhaul link manager 1020 may establish the second backhaul link between the second mobile terminal function of the relay node and the second parent node, where the identifier of the relay node is transmitted to the second network management function via the established second backhaul link. In some examples, the backhaul link manager 1020 may exchange backhaul information using the first backhaul link, the second backhaul link, or both, based on the received backhaul link configuration.

In some cases, the first parent node and the second parent node are associated with the network management function supported by a CU. In some cases, the network management function includes a gNB, a gNB-CU, a gNB-CU-CP, an eNB, an eNB-CU, an eNB-CU-CP, a centralized controller, a topology function, a route function, a resource function, or some combination thereof.

The relay node ID manager 1040 may exchange, using a first mobile terminal function of the relay node, an identifier of the relay node with a first network management function via a first backhaul link to a first parent node. In some examples, the relay node ID manager 1040 may transmit, using a second mobile terminal function of the relay node, the identifier of the relay node to a second network management function via a second backhaul link to a second parent node.

The MT capability manager 1025 may transmit, via the first backhaul link using the first mobile terminal function, a capability report to the network management function. In some examples, the MT capability manager 1025 may transmit, using the second mobile terminal function, a capability report to the second parent node, where the capability report includes an identifier of the second mobile terminal function, one or more RATs supported by the second mobile terminal function, one or more frequency bands supported by the second mobile terminal function, azimuth and elevation patterns supported by the second mobile terminal function, RF capabilities of the second mobile terminal function, isolation between the first mobile terminal function and the second mobile terminal function, an identifier of the relay node, a list of supported mobile terminal functions, or some combination thereof.

In some cases, the capability report includes an identifier of the second mobile terminal function, one or more RATs supported by the second mobile terminal function, one or more frequency bands supported by the second mobile terminal function, azimuth and elevation patterns supported by the second mobile terminal function, RF capabilities of the second mobile terminal function, isolation between the first and second mobile terminal function, an identifier of the relay node, a list of supported mobile terminal functions, or some combination thereof.

The measurement configuration manager 1030 may receive, via the first backhaul link using the first mobile terminal function of the relay node, a measurement configuration for the second mobile terminal function of the relay node based on the transmitted capability report. In some examples, the measurement configuration manager 1030 may receive, using the first mobile terminal function of the relay node, a measurement configuration for the second mobile terminal function, where the one or more signal strength measurements are performed based on the received measurement configuration. In some cases, the measurement configuration includes an identifier of the second mobile terminal function, an identifier of the second parent node, or some combination thereof.

The parent node measurement manager 1035 may perform, using the second mobile terminal function of the relay node, measurements of the second parent node transmission based on the measurement configuration, where the transmitted measurement report includes the measurements. In some examples, the parent node measurement manager 1035 may perform, using the second mobile terminal function, one or more signal strength measurements of one or more parent nodes. In some examples, the parent node measurement manager 1035 may identify the second parent node based on the one or more signal strength measurements, where the second backhaul link is established based on the identified second parent node.

The management function ID manager 1045 may receive an identifier of the first network management function associated with the first backhaul link. In some examples, the management function ID manager 1045 may receive an identifier of the second network management function associated with the second backhaul link. In some examples, the management function ID manager 1045 may determine the identifier of the first management function associated with the first backhaul link is different from the identifier of the second management function associated with the second backhaul link. In some examples, the management function ID manager 1045 may identify the backhaul link configuration for the second mobile terminal function is associated with the second management function of the second backhaul link. In some examples, the management function ID manager 1045 may determine the identifier of the first management function associated with the first backhaul link is the same as the identifier of the second management function associated with the second backhaul link. In some examples, the management function ID manager 1045 may identify the backhaul link configuration for the second mobile terminal function is associated with a same management function of the first backhaul link and second backhaul link.

Figure 11:
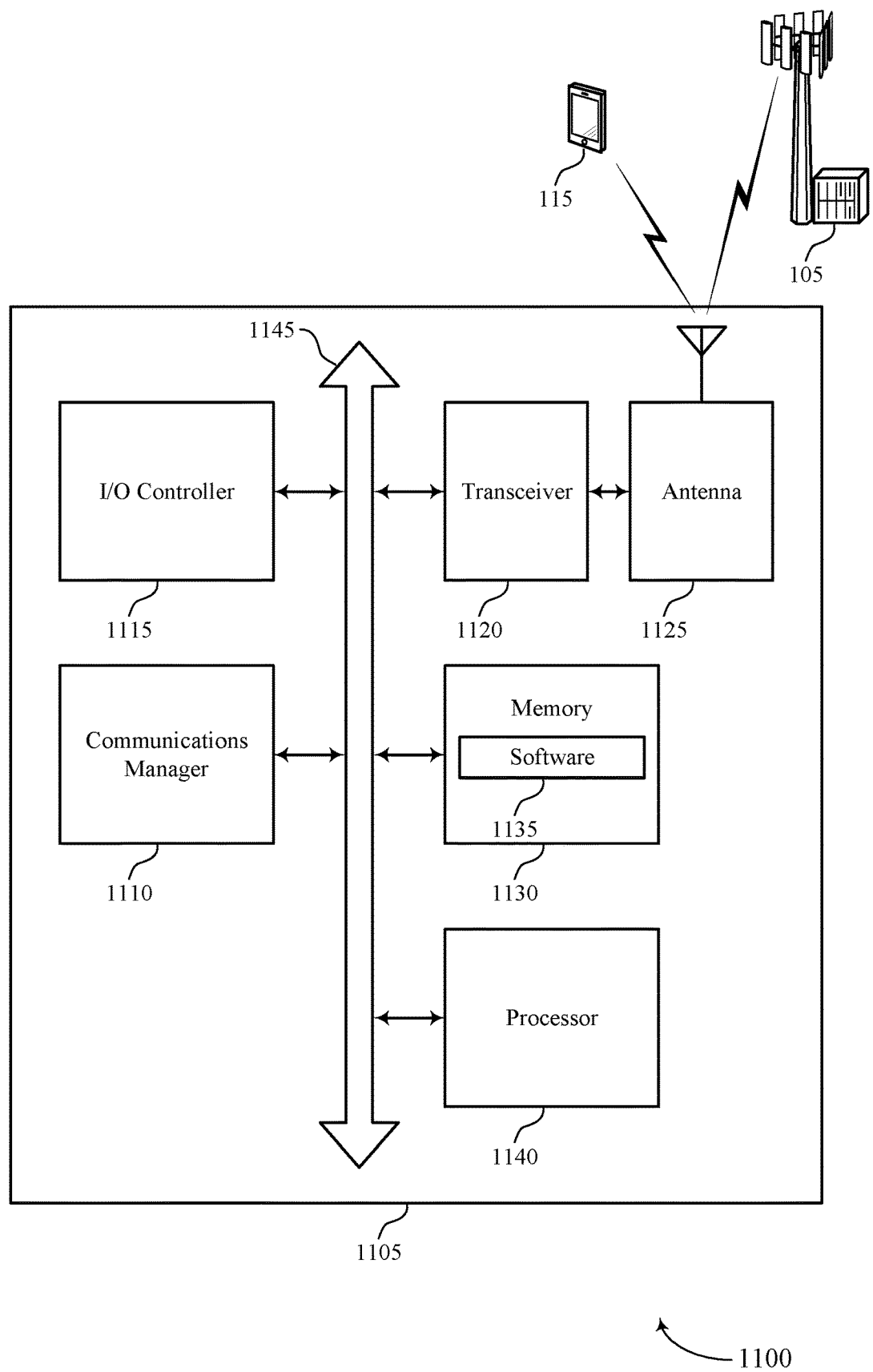
FIG. 11 shows a diagram of a system including a device that supports relay nodes with multi-connected cellular backhaul in accordance with one or more aspects of the present disclosure.

FIG. 11 shows a diagram of a system 1100 including a device 1105 that supports relay nodes with multi-connected cellular backhaul in accordance with one or more aspects of the present disclosure. The device 1105 may be an example of or include the components of device 805, device 905, or a relay node (e.g., such as a relay base station 105, a relay IAB node 320, relay node 505, relay node 705) as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may transmit, using a first mobile terminal function of the relay node, a measurement report to a network management function via a first backhaul link to a first parent node, where the measurement report includes measurements of a second parent node transmission, receive, via the first backhaul link using the first mobile terminal function of the relay node, a backhaul link configuration for the second mobile terminal function based on the transmitted measurement report, and establish a second backhaul link between the second mobile terminal function of the relay node and the second parent node based on the received backhaul link configuration. The communications manager 1110 may also exchange, using a first mobile terminal function of the relay node, an identifier of the relay node with a first network management function via a first backhaul link to a first parent node, transmit, using a second mobile terminal function of the relay node, the identifier of the relay node to a second network management function via a second backhaul link to a second parent node, and receive a backhaul link configuration for the second mobile terminal function based on the transmission of the identifier of the relay node to the first network management function via the first backhaul link and the transmission of the identifier of the relay node to the second network management function via the second backhaul link.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code or software 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting relay nodes with multi-connected cellular backhaul).

The software 1135 may include instructions to implement aspects of the present disclosure, including instructions to support wireless communications. The software 1135 may be stored in a non-transitory computer-readable medium such as system memory or other type of memory. In some cases, the software 1135 may not be directly executable by the processor 1140 but may cause a computer (e.g., when compiled and executed) to perform functions described herein.

Figure 12:
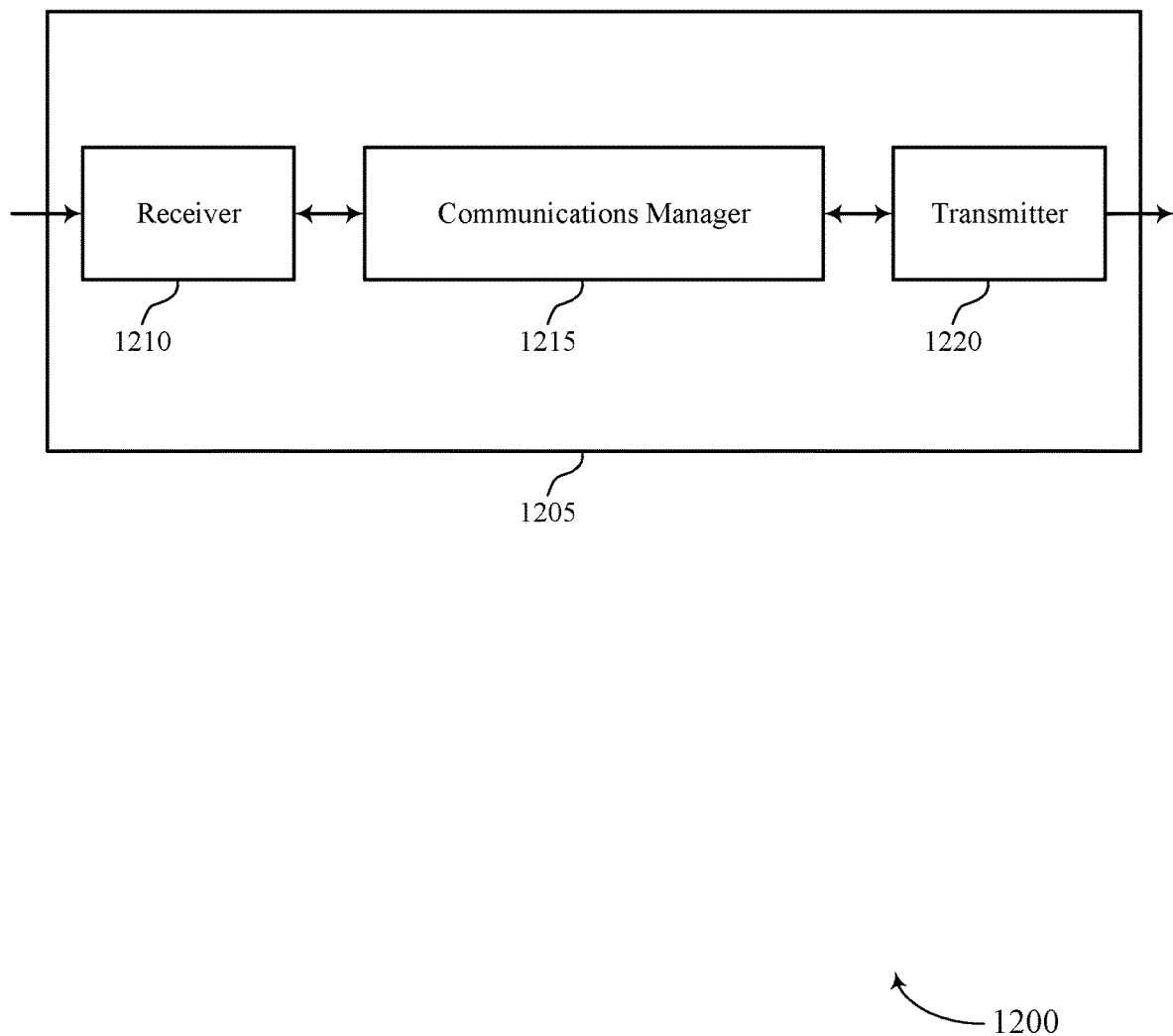
FIGS. 12 and 13 show block diagrams of devices that support relay nodes with multi-connected cellular backhaul in accordance with one or more aspects of the present disclosure.

FIG. 12 shows a block diagram 1200 of a device 1205 that supports relay nodes with multi-connected cellular backhaul in accordance with one or more aspects of the present disclosure. The device 1205 may be an example of aspects of a base station 105, a parent node, or a network management function as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to relay nodes with multi-connected cellular backhaul, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may receive, by a network management function via a first backhaul link, a measurement report from a first mobile terminal function of a relay node, where the measurement report includes measurements of a second parent node transmission. The communications manager 1215 may identify a backhaul link configuration for the second mobile terminal function based on the received measurement report. The communications manager 1215 may transmit, via the first backhaul link, the identified backhaul link configuration for the second mobile terminal function to the first mobile terminal function of the relay node.

The communications manager 1215 may also identify a relay node is connected to a first parent node via a first mobile terminal function of the relay node, identify the relay node is connected to a second parent node via a second mobile terminal function of the relay node, and transmit a backhaul link configuration for the second mobile terminal function based on the identified relay node connections. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
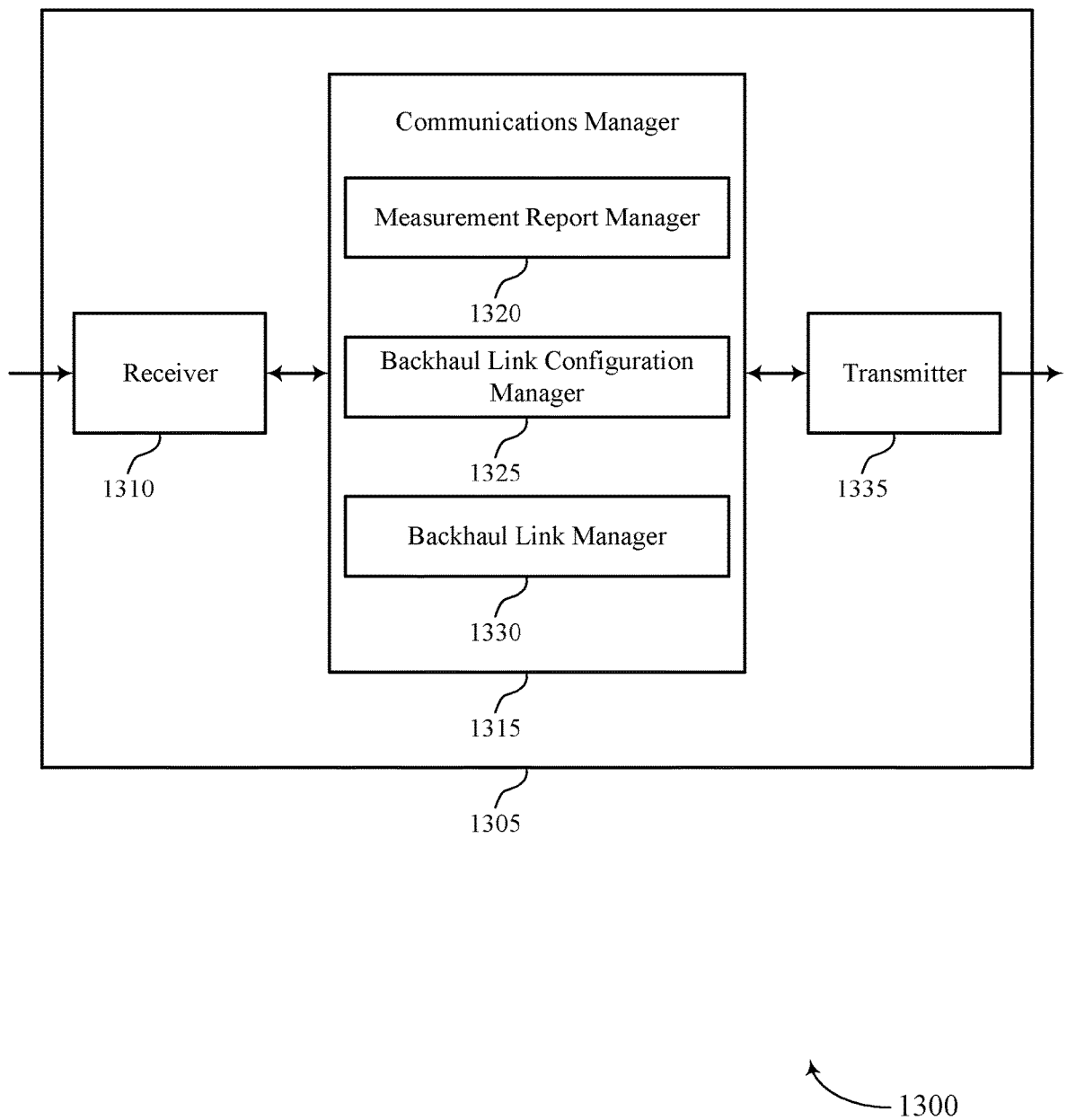

FIG. 13 shows a block diagram 1300 of a device 1305 that supports relay nodes with multi-connected cellular backhaul in accordance with one or more aspects of the present disclosure. The device 1305 may be an example of aspects of a device 1205, or aspects of a base station 105, a parent node, or a network management function as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to relay nodes with multi-connected cellular backhaul, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a measurement report manager 1320, a backhaul link configuration manager 1325, and a backhaul link manager 1330. The communications manager 1315 may be an example of aspects of the communications manager 1510 described herein.

The measurement report manager 1320 may receive, by a network management function via a first backhaul link, a measurement report from a first mobile terminal function of a relay node, where the measurement report includes measurements of a second parent node transmission.

The backhaul link configuration manager 1325 may identify a backhaul link configuration for the second mobile terminal function based on the received measurement report and transmit, via the first backhaul link, the identified backhaul link configuration for the second mobile terminal function to the first mobile terminal function of the relay node.

The backhaul link manager 1330 may identify a relay node is connected to a first parent node via a first mobile terminal function of the relay node and identify the relay node is connected to a second parent node via a second mobile terminal function of the relay node.

The backhaul link configuration manager 1325 may transmit a backhaul link configuration for the second mobile terminal function based on the identified relay node connections.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
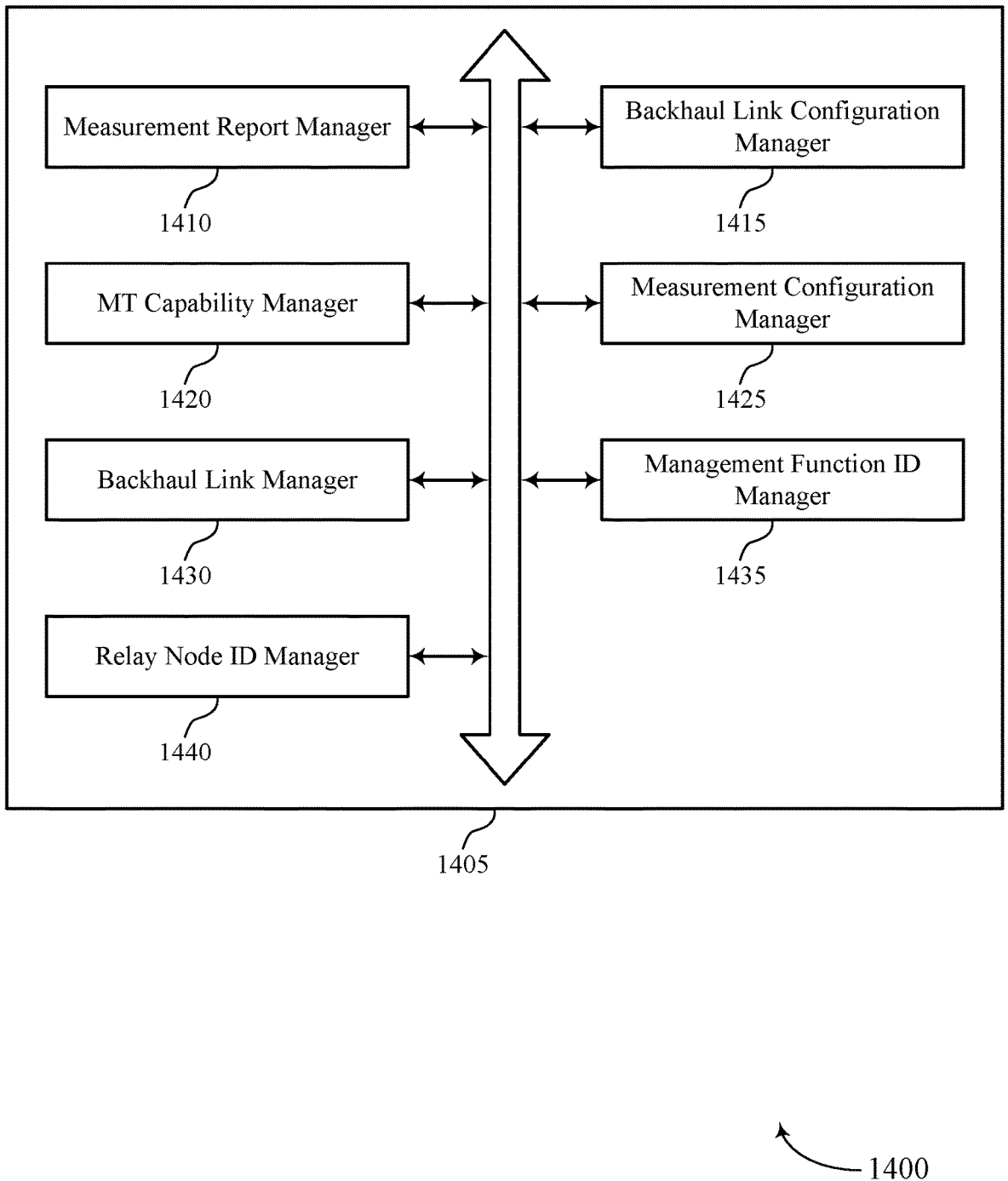
FIG. 14 shows a block diagram of a communications manager that supports relay nodes with multi-connected cellular backhaul in accordance with one or more aspects of the present disclosure.

FIG. 14 shows a block diagram 1400 of a communications manager 1405 that supports relay nodes with multi-connected cellular backhaul in accordance with one or more aspects of the present disclosure. The communications manager 1405 may be an example of aspects of a communications manager 1215, a communications manager 1315, or a communications manager 1510 described herein. The communications manager 1405 may include a measurement report manager 1410, a backhaul link configuration manager 1415, a MT capability manager 1420, a measurement configuration manager 1425, a backhaul link manager 1430, a management function ID manager 1435, and a relay node ID manager 1440. Each of these modules may communicate, directly or indirectly, with one another (e.g., via one or more buses).

The measurement report manager 1410 may receive, by a network management function via a first backhaul link, a measurement report from a first mobile terminal function of a relay node, where the measurement report includes measurements of a second parent node transmission.

The backhaul link configuration manager 1415 may identify a backhaul link configuration for the second mobile terminal function based on the received measurement report. In some examples, the backhaul link configuration manager 1415 may transmit, via the first backhaul link, the identified backhaul link configuration for the second mobile terminal function to the first mobile terminal function of the relay node. In some examples, the backhaul link configuration manager 1415 may transmit a backhaul link configuration for the second mobile terminal function based on the identified relay node connections.

In some examples, transmitting a routing configuration for a second backhaul link, between the second mobile terminal function of the relay node and the first parent node, and a first backhaul link, between the first MT of the relay node and the first parent node, where the routing configuration includes route utilization information, link utilization information, resource allocation information, or some combination thereof.

In some cases, the backhaul link configuration for the second mobile terminal function includes an identifier of the second mobile terminal function of the relay node, an identifier of the second parent node, route configuration parameters, or some combination thereof. In some cases, the backhaul link configuration for the second mobile terminal function is transmitted in a container of a RRC message to the first mobile terminal function. In some cases, the backhaul link configuration for the second mobile terminal function is transmitted in F1-AP signaling.

The backhaul link manager 1430 may identify a relay node is connected to a first parent node via a first mobile terminal function of the relay node. In some examples, the backhaul link manager 1430 may identify the relay node is connected to a second parent node via a second mobile terminal function of the relay node. In some examples, the backhaul link manager 1430 may receive backhaul information from the first mobile terminal function of the relay node via the first parent node, from the second mobile terminal function of the relay node via the second parent node, or both, based on the transmitted backhaul link configuration. In some cases, the first backhaul link, between the first mobile terminal function of the relay node and the first parent node, and a second backhaul link, between the second mobile terminal function of the relay node and the first parent node, are associated with a cellular RAT.

The MT capability manager 1420 may receive, via the first backhaul link, a capability report from the first mobile terminal function of the relay node, where the capability report includes capability information for the second mobile terminal function of the relay node. In some cases, the capability report includes an identifier of the second mobile terminal function, one or more RATs supported by the second mobile terminal function, one or more frequency bands supported by the second mobile terminal function, azimuth and elevation patterns supported by the second mobile terminal function, RF capabilities of the second mobile terminal function, isolation between the first mobile terminal function and the second mobile terminal function, an identifier of the relay node, a list of supported mobile terminal functions, or some combination thereof.

The measurement configuration manager 1425 may identify a measurement configuration for the second mobile terminal function of the relay node based on the received capability report. In some examples, the measurement configuration manager 1425 may transmit, via the first backhaul link, the identified measurement configuration to the first mobile terminal function, where the measurement report is received based on the transmitted measurement configuration. In some examples, transmitting a measurement configuration for the second mobile terminal function to the relay node, where the measurement configuration includes an identifier of the second parent node, policy information for relay node selection of the second parent node, or some combination thereof. In some cases, the measurement configuration includes an identifier of the second mobile terminal function, an identifier of the second parent node, or some combination thereof.

The management function ID manager 1435 may transmit a network management function identifier to the relay node via the first parent node. In some examples, the management function ID manager 1435 may transmit the management function identifier to the relay node via the second parent node. The relay node ID manager 1440 may receive an identifier of the relay node from the first parent node. In some examples, the relay node ID manager 1440 may receive the identifier of the relay node from the second parent node, where the identification that the relay node is connected to the second parent node via the second mobile terminal function of the relay node is based on the identifier of the relay node from the second parent node being the same as the identifier of the relay node from the first parent node.

Figure 15:
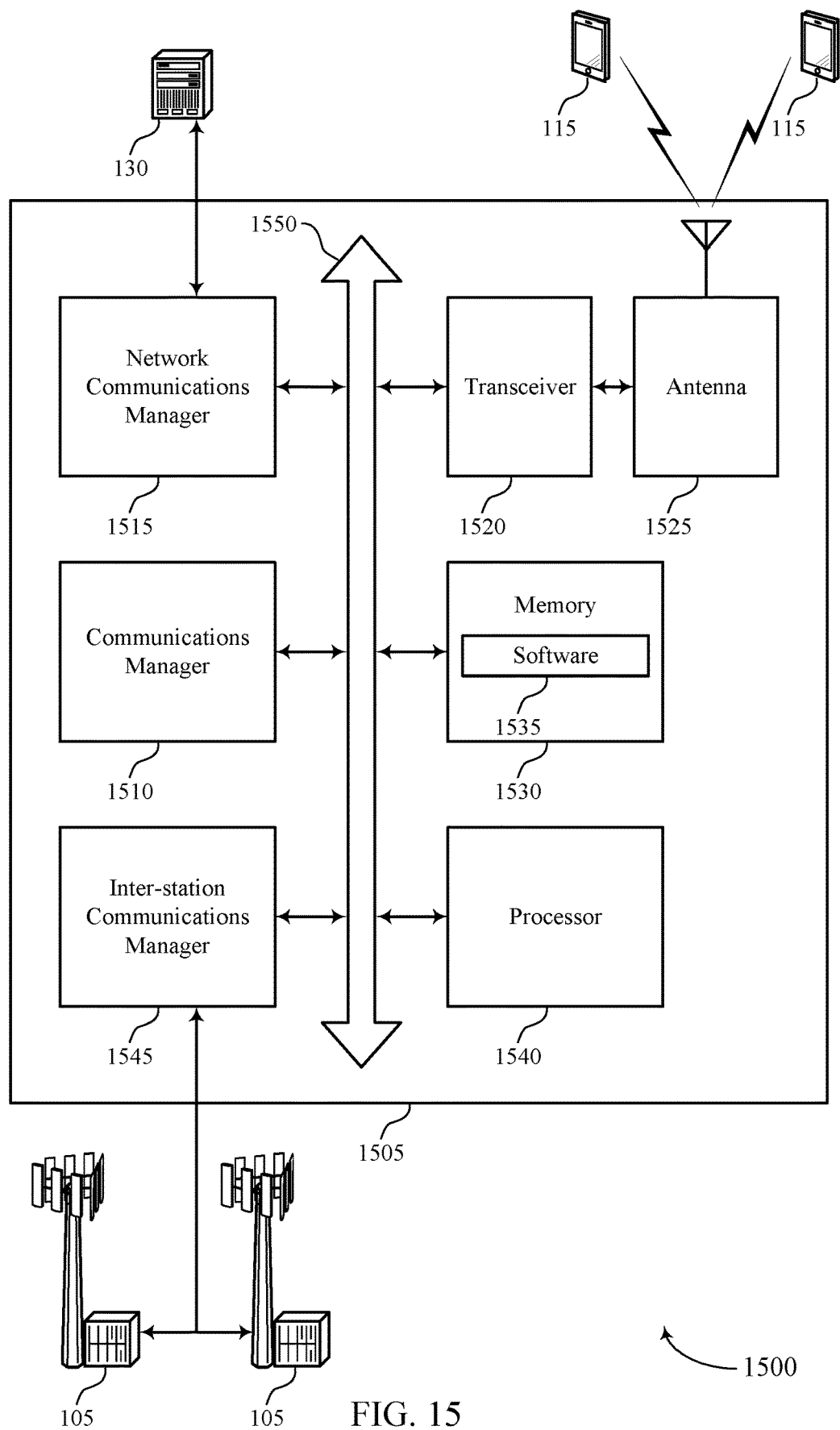
FIG. 15 shows a diagram of a system including a device that supports relay nodes with multi-connected cellular backhaul in accordance with one or more aspects of the present disclosure.

FIG. 15 shows a diagram of a system 1500 including a device 1505 that supports relay nodes with multi-connected cellular backhaul in accordance with one or more aspects of the present disclosure. The device 1505 may be an example of or include the components of device 1205, device 1305, or aspects of a base station 105, a parent node, or a network management function as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may receive, by a network management function via a first backhaul link, a measurement report from a first mobile terminal function of a relay node, where the measurement report includes measurements of a second parent node transmission, identify a backhaul link configuration for the second mobile terminal function based on the received measurement report, and transmit, via the first backhaul link, the identified backhaul link configuration for the second mobile terminal function to the first mobile terminal function of the relay node. The communications manager 1510 may also identify a relay node is connected to a first parent node via a first mobile terminal function of the relay node, identify the relay node is connected to a second parent node via a second mobile terminal function of the relay node, and transmit a backhaul link configuration for the second mobile terminal function based on the identified relay node connections.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code or software 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting relay nodes with multi-connected cellular backhaul).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The software 1535 may include instructions to implement aspects of the present disclosure, including instructions to support wireless communications. The software 1535 may be stored in a non-transitory computer-readable medium such as system memory or other type of memory. In some cases, the software 1535 may not be directly executable by the processor 1540 but may cause a computer (e.g., when compiled and executed) to perform functions described herein.

Figure 16:
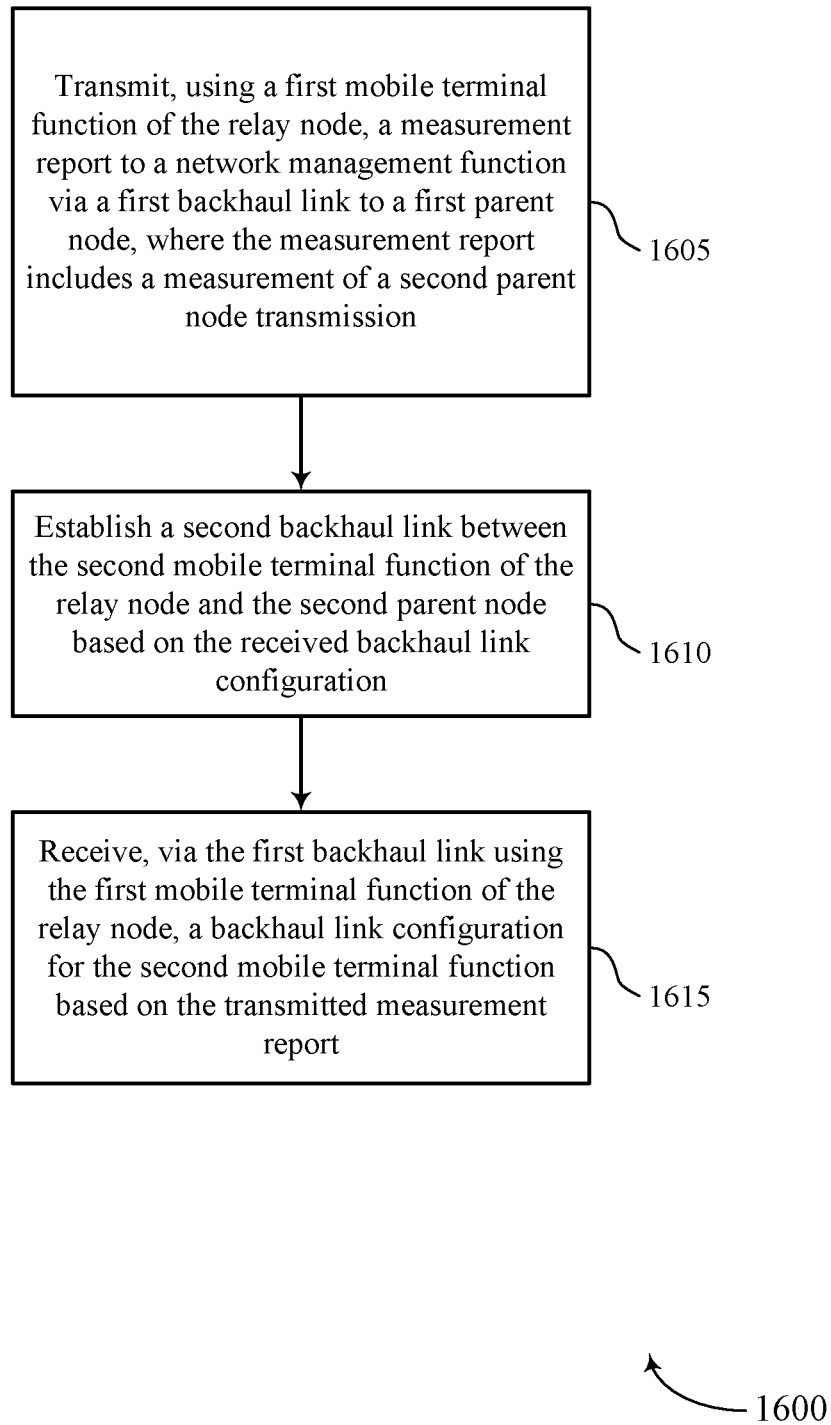
FIGS. 16 through 20 show flowcharts illustrating methods that support relay nodes with multi-connected cellular backhaul in accordance with one or more aspects of the present disclosure.

FIG. 16 shows a flowchart illustrating a method 1600 that supports relay nodes with multi-connected cellular backhaul in accordance with one or more aspects of the present disclosure. The operations of method 1600 may be implemented by a relay node or its components as described herein. For example, the operations of method 1600 may be performed by a communications manager as described with reference to FIGS. 8 through 11. In some examples, a relay node may execute a set of instructions to control the functional elements of the relay node to perform the functions described below. Additionally or alternatively, a relay node may perform aspects of the functions described below using special-purpose hardware.

At 1605, the relay node may transmit, using a first mobile terminal function of the relay node, a measurement report to a network management function via a first backhaul link to a first parent node, where the measurement report includes measurements of a second parent node trans. The operations of 1605 may be performed according to the methods described herein. In some examples, aspects of the operations of 1605 may be performed by a measurement report manager as described with reference to FIGS. 8 through 11.

At 1610, the relay node may establish a second backhaul link between the second mobile terminal function of the relay node and the second parent node based on the received backhaul link configuration. The operations of 1610 may be performed according to the methods described herein. In some examples, aspects of the operations of 1610 may be performed by a backhaul link manager as described with reference to FIGS. 8 through 11.

At 1615, the relay node may receive, via the first backhaul link using the first mobile terminal function of the relay node, a backhaul link configuration for the second mobile terminal function based on the transmitted measurement report. The operations of 1615 may be performed according to the methods described herein. In some examples, aspects of the operations of 1615 may be performed by a backhaul link configuration manager as described with reference to FIGS. 8 through 11.

Figure 17:
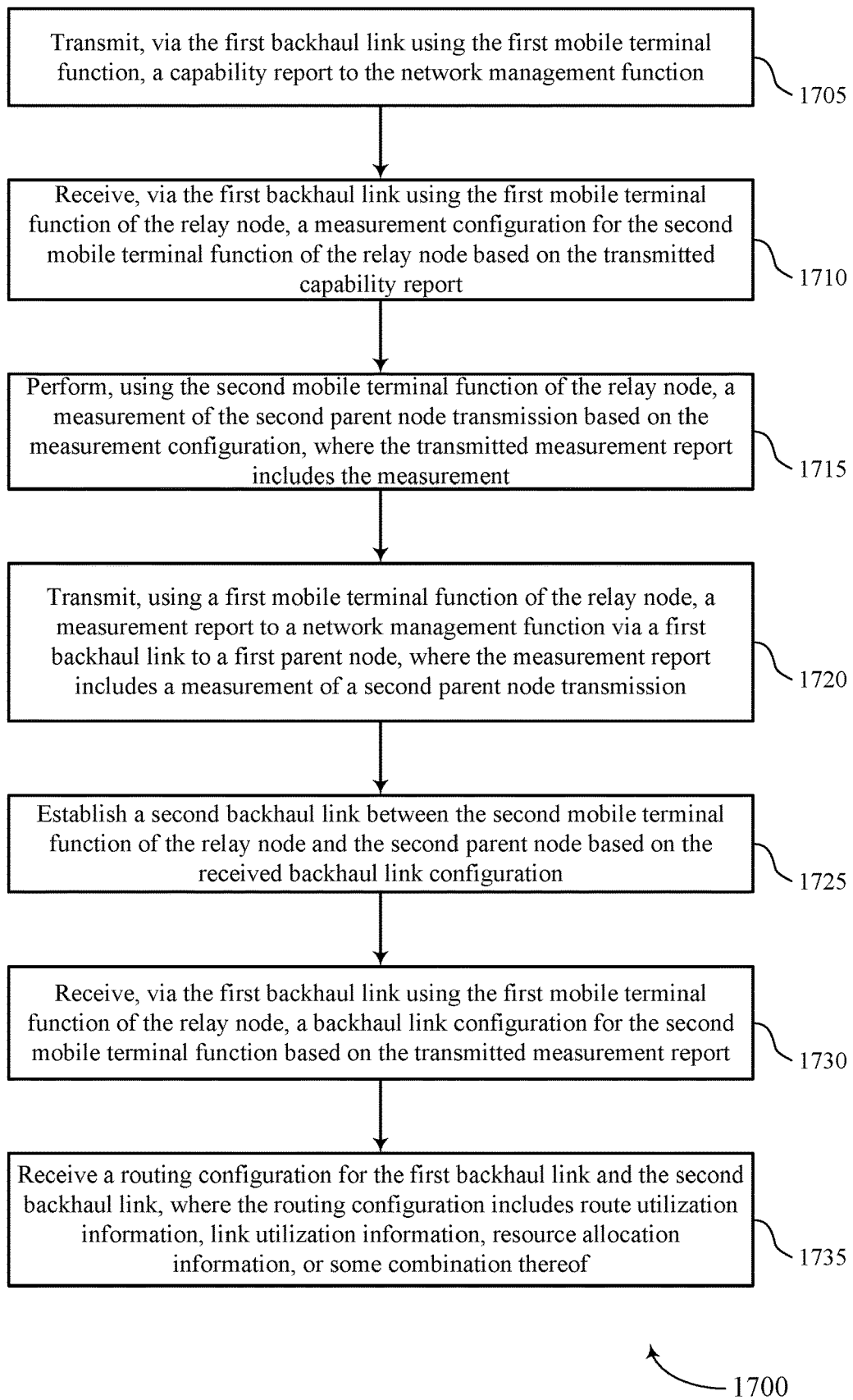

FIG. 17 shows a flowchart illustrating a method 1700 that supports relay nodes with multi-connected cellular backhaul in accordance with one or more aspects of the present disclosure. The operations of method 1700 may be implemented by a relay node or its components as described herein. For example, the operations of method 1700 may be performed by a communications manager as described with reference to FIGS. 8 through 11. In some examples, a relay node may execute a set of instructions to control the functional elements of the relay node to perform the functions described below. Additionally or alternatively, a relay node may perform aspects of the functions described below using special-purpose hardware.

At 1705, the relay node may transmit, via the first backhaul link using the first mobile terminal function, a capability report to the network management function. The operations of 1705 may be performed according to the methods described herein. In some examples, aspects of the operations of 1705 may be performed by a MT capability manager as described with reference to FIGS. 8 through 11.

At 1710, the relay node may receive, via the first backhaul link using the first mobile terminal function of the relay node, a measurement configuration for the second mobile terminal function of the relay node based on the transmitted capability report. The operations of 1710 may be performed according to the methods described herein. In some examples, aspects of the operations of 1710 may be performed by a measurement configuration manager as described with reference to FIGS. 8 through 11.

At 1715, the relay node may perform, using the second mobile terminal function of the relay node, measurements of the second parent node transmission based on the measurement configuration, where the transmitted measurement report includes the measurements. The operations of 1715 may be performed according to the methods described herein. In some examples, aspects of the operations of 1715 may be performed by a parent node measurement manager as described with reference to FIGS. 8 through 11.

At 1720, the relay node may transmit, using a first mobile terminal function of the relay node, a measurement report to a network management function via a first backhaul link to a first parent node, where the measurement report includes measurements of a second parent node transmission. The operations of 1720 may be performed according to the methods described herein. In some examples, aspects of the operations of 1720 may be performed by a measurement report manager as described with reference to FIGS. 8 through 11.

At 1725, the relay node may establish a second backhaul link between the second mobile terminal function of the relay node and the second parent node based on the received backhaul link configuration. The operations of 1725 may be performed according to the methods described herein. In some examples, aspects of the operations of 1725 may be performed by a backhaul link manager as described with reference to FIGS. 8 through 11.

At 1730, the relay node may receive, via the first backhaul link using the first mobile terminal function of the relay node, a backhaul link configuration for the second mobile terminal function based on the transmitted measurement report. The operations of 1730 may be performed according to the methods described herein. In some examples, aspects of the operations of 1730 may be performed by a backhaul link configuration manager as described with reference to FIGS. 8 through 11.

At 1735, the relay node may receive a routing configuration for the first backhaul link and the second backhaul link, where the routing configuration includes route utilization information, link utilization information, resource allocation information, or some combination thereof. The operations of 1735 may be performed according to the methods described herein. In some examples, aspects of the operations of 1735 may be performed by a backhaul link configuration manager as described with reference to FIGS. 8 through 11.

Figure 18:
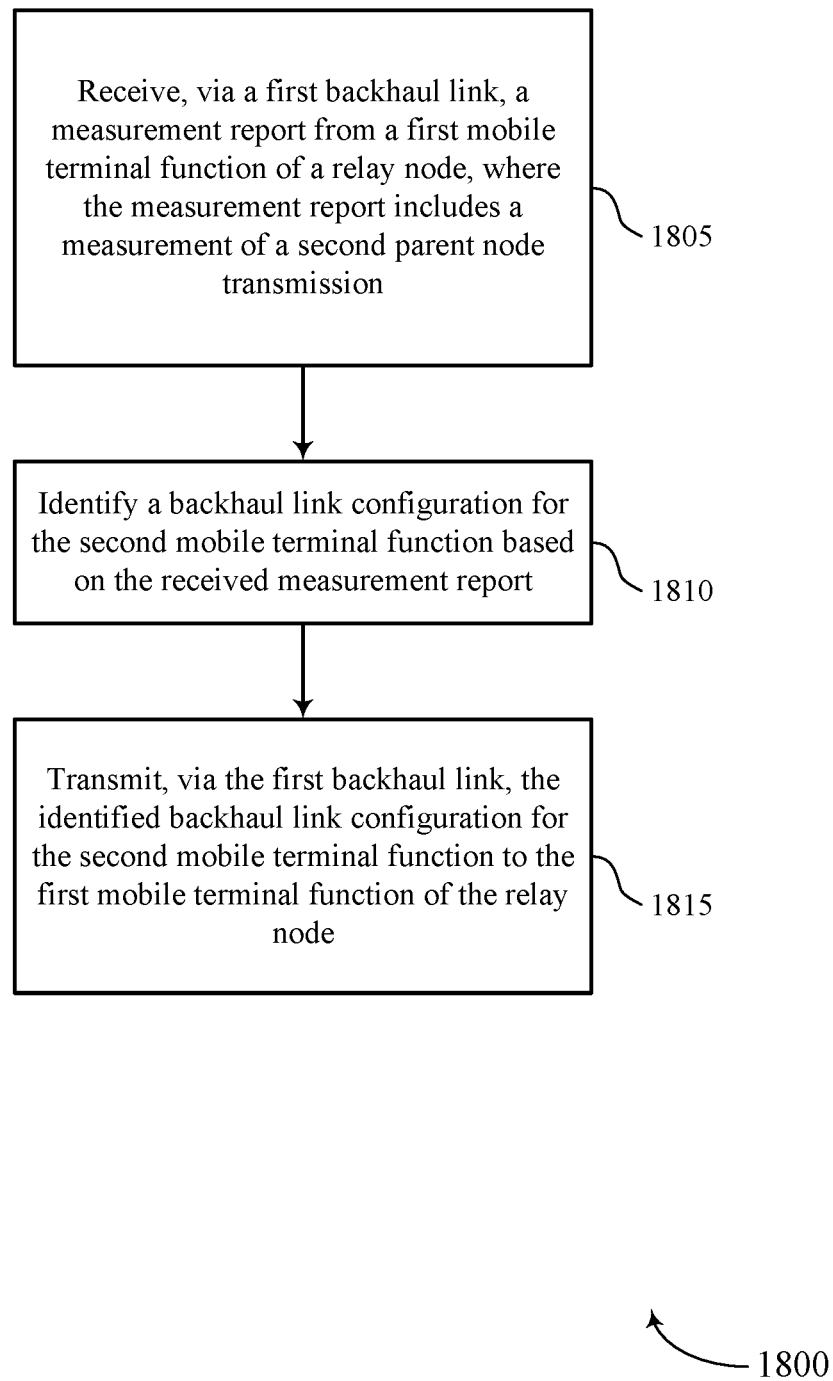

FIG. 18 shows a flowchart illustrating a method 1800 that supports relay nodes with multi-connected cellular backhaul in accordance with one or more aspects of the present disclosure. The operations of method 1800 may be implemented by a management function (e.g., or CU or base station) or its components as described herein. For example, the operations of method 1800 may be performed by a communications manager as described with reference to FIGS. 12 through 15. In some examples, a management function (e.g., or CU or base station) may execute a set of instructions to control the functional elements of the management function (e.g., or CU or base station) to perform the functions described below. Additionally or alternatively, a management function (e.g., or CU or base station) may perform aspects of the functions described below using special-purpose hardware.

At 1805, the management function (e.g., or CU or base station) may receive, by a network management function via a first backhaul link, a measurement report from a first mobile terminal function of a relay node, where the measurement report includes measurements of a second parent node transmission. The operations of 1805 may be performed according to the methods described herein. In some examples, aspects of the operations of 1805 may be performed by a measurement report manager as described with reference to FIGS. 12 through 15.

At 1810, the management function (e.g., or CU or base station) may identify a backhaul link configuration for the second mobile terminal function based on the received measurement report. The operations of 1810 may be performed according to the methods described herein. In some examples, aspects of the operations of 1810 may be performed by a backhaul link configuration manager as described with reference to FIGS. 12 through 15.

At 1815, the management function (e.g., or CU or base station) may transmit, via the first backhaul link, the identified backhaul link configuration for the second mobile terminal function to the first mobile terminal function of the relay node. The operations of 1815 may be performed according to the methods described herein. In some examples, aspects of the operations of 1815 may be performed by a backhaul link configuration manager as described with reference to FIGS. 12 through 15.

Figure 19:
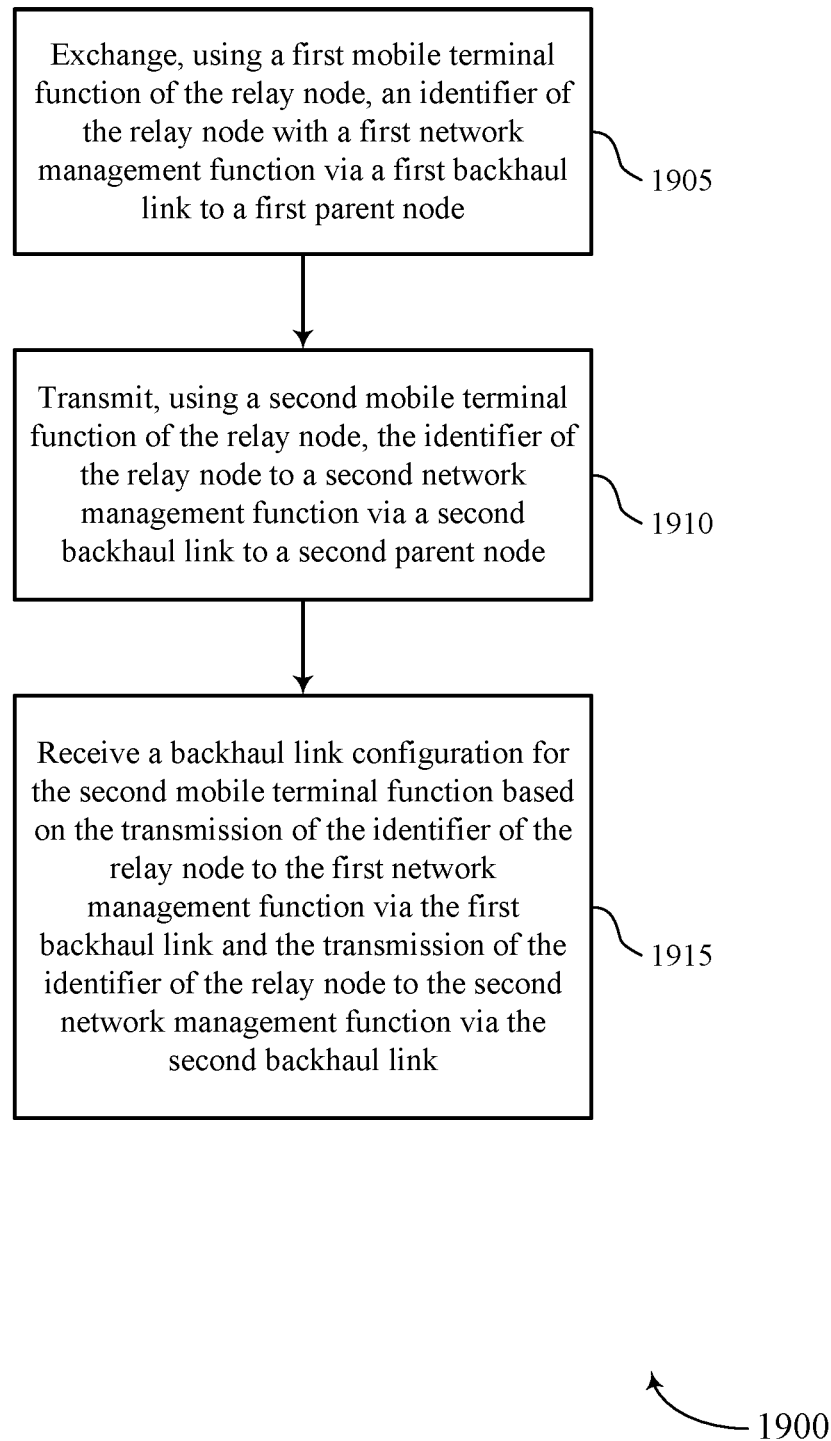

FIG. 19 shows a flowchart illustrating a method 1900 that supports relay nodes with multi-connected cellular backhaul in accordance with one or more aspects of the present disclosure. The operations of method 1900 may be implemented by a relay node or its components as described herein. For example, the operations of method 1900 may be performed by a communications manager as described with reference to FIGS. 8 through 11. In some examples, a relay node may execute a set of instructions to control the functional elements of the relay node to perform the functions described below. Additionally or alternatively, a relay node may perform aspects of the functions described below using special-purpose hardware.

At 1905, the relay node may exchange, using a first mobile terminal function of the relay node, an identifier of the relay node with a first network management function via a first backhaul link to a first parent node. The operations of 1905 may be performed according to the methods described herein. In some examples, aspects of the operations of 1905 may be performed by a relay node ID manager as described with reference to FIGS. 8 through 11.

At 1910, the relay node may transmit, using a second mobile terminal function of the relay node, the identifier of the relay node to a second network management function via a second backhaul link to a second parent node. The operations of 1910 may be performed according to the methods described herein. In some examples, aspects of the operations of 1910 may be performed by a relay node ID manager as described with reference to FIGS. 8 through 11.

At 1915, the relay node may receive a backhaul link configuration for the second mobile terminal function based on the transmission of the identifier of the relay node to the first network management function via the first backhaul link and the transmission of the identifier of the relay node to the second network management function via the second backhaul link. The operations of 1915 may be performed according to the methods described herein. In some examples, aspects of the operations of 1915 may be performed by a backhaul link configuration manager as described with reference to FIGS. 8 through 11.

Figure 20:
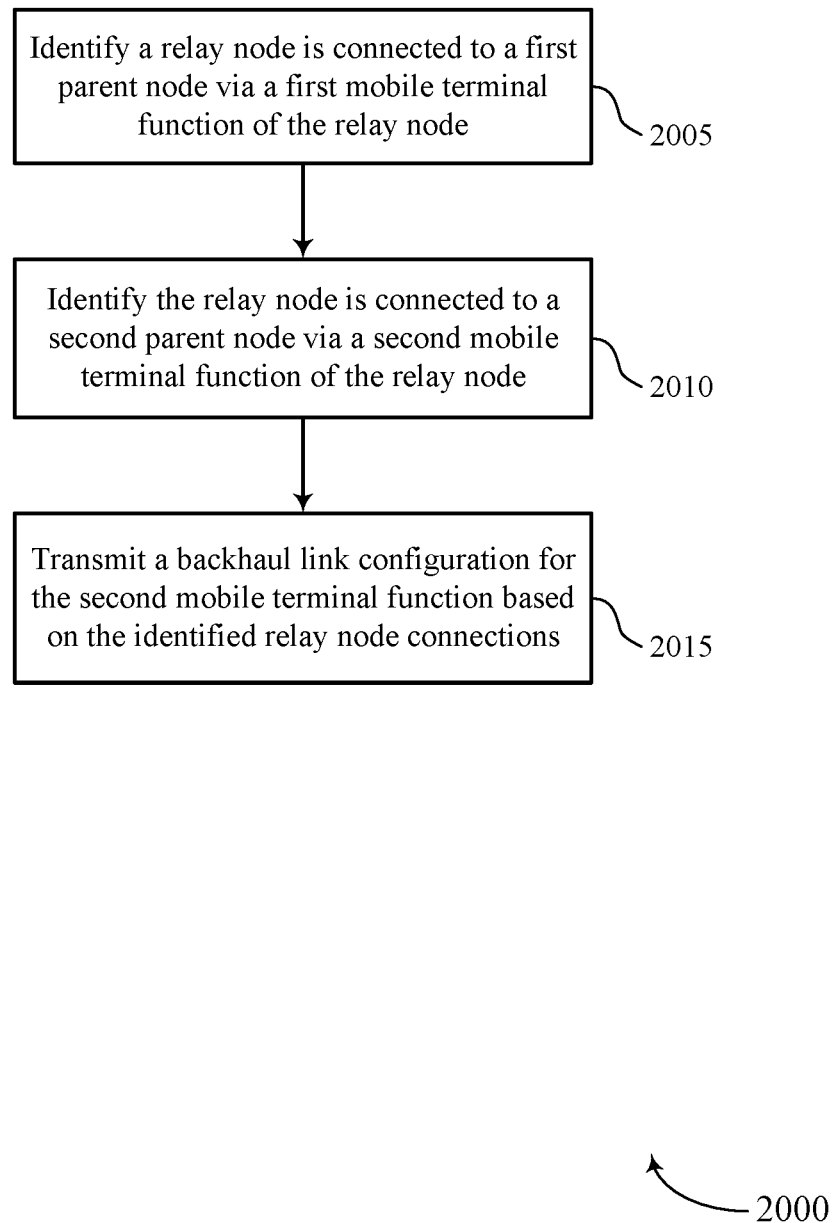

FIG. 20 shows a flowchart illustrating a method 2000 that supports relay nodes with multi-connected cellular backhaul in accordance with one or more aspects of the present disclosure. The operations of method 2000 may be implemented by a management function (e.g., or CU or base station) or its components as described herein. For example, the operations of method 2000 may be performed by a communications manager as described with reference to FIGS. 12 through 15. In some examples, a management function (e.g., or CU or base station) may execute a set of instructions to control the functional elements of the management function (e.g., or CU or base station) to perform the functions described below. Additionally or alternatively, a management function (e.g., or CU or base station) may perform aspects of the functions described below using special-purpose hardware.

At 2005, the management function (e.g., or CU or base station) may identify a relay node is connected to a first parent node via a first mobile terminal function of the relay node. The operations of 2005 may be performed according to the methods described herein. In some examples, aspects of the operations of 2005 may be performed by a backhaul link manager as described with reference to FIGS. 12 through 15.

At 2010, the management function (e.g., or CU or base station) may identify the relay node is connected to a second parent node via a second mobile terminal function of the relay node. The operations of 2010 may be performed according to the methods described herein. In some examples, aspects of the operations of 2010 may be performed by a backhaul link manager as described with reference to FIGS. 12 through 15.

At 2015, the management function (e.g., or CU or base station) transmit a backhaul link configuration for the second mobile terminal function based on the identified relay node connections. The operations of 2015 may be performed according to the methods described herein. In some examples, aspects of the operations of 2015 may be performed by a backhaul link configuration manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a relay node, comprising:

exchanging, using a first mobile terminal function of the relay node, an identifier of the relay node with a first network management function via a first backhaul link to a first parent node;

transmitting, using a second mobile terminal function of the relay node different from the first mobile terminal function, the identifier of the relay node to a second network management function via a second backhaul link to a second parent node; and receiving a backhaul link configuration for the second mobile terminal function based at least in part on the transmission of the identifier of the relay node to the first network management function via the first backhaul link and the transmission of the identifier of the relay node to the second network management function via the second backhaul link.

2. The method of claim 1, further comprising:

exchanging backhaul information with the first network management function via the first backhaul link to the first parent node using the first mobile terminal function, with the second network management function via the second backhaul link to the second parent node using the second mobile terminal function, or both, based at least in part on the received backhaul link configuration.

3. The method of claim 1, further comprising:

establishing the first backhaul link between the first mobile terminal function of the relay node and the first parent node, wherein the identifier of the relay node is transmitted to the first network management function via the established first backhaul link; and establishing the second backhaul link between the second mobile terminal function of the relay node and the second parent node, wherein the identifier of the relay node is transmitted to the second network management function via the established second backhaul link.

4. The method of claim 3, further comprising:
receiving an identifier of the first network management function associated with the first backhaul link; and
receiving an identifier of the second network management function associated with the second backhaul link.

5. The method of claim 4, further comprising:
determining the identifier of the first management function associated with the first backhaul link is different from the identifier of the second management function associated with the second backhaul link; and
identifying the backhaul link configuration for the second mobile terminal function is associated with the second management function of the second backhaul link.

6. The method of claim 4, further comprising:
determining the identifier of the first management function associated with the first backhaul link is the same as the identifier of the second management function associated with the second backhaul link; and
identifying the backhaul link configuration for the second mobile terminal function is associated with a same management function of the first backhaul link and second backhaul link.

7. The method of claim 3, wherein establishing the second backhaul link between the second mobile terminal function of the relay node and the second parent node further comprises:
performing, using the second mobile terminal function, one or more signal strength measurements of one or more parent nodes; and
identifying the second parent node based at least in part on the one or more signal strength measurements, wherein the second backhaul link is established based at least in part on the identified second parent node.

8. The method of claim 7, further comprising:
receiving, using the first mobile terminal function of the relay node, a measurement configuration for the second mobile terminal function, wherein the one or more signal strength measurements are performed based at least in part on the received measurement configuration.

9. The method of claim 3, further comprising:
exchanging backhaul information using the first backhaul link, the second backhaul link, or both, based at least in part on the received backhaul link configuration.

10. The method of claim 3, further comprising:
transmitting, using the second mobile terminal function, a capability report to the second parent node, wherein the capability report comprises an identifier of the second mobile terminal function, one or more radio access technologies (RATs) supported by the second mobile terminal function, one or more frequency bands supported by the second mobile terminal function, azimuth and elevation patterns supported by the second mobile terminal function, radio frequency (RF) capabilities of the second mobile terminal function, isolation between the first mobile terminal function and the second mobile terminal function, an identifier of the relay node, a list of supported mobile terminal functions, or some combination thereof.

11. The method of claim 3, wherein the first network management function and the second network management function each comprise a Next Generation Node B (gNB), a gNB-central unit (gNB-CU), a gNB-CU-control plane (gNB-CU-CP), an evolved Node B (eNB), an eNB-central unit (eNB-CU), an eNB-CU-control plane (eNB-CU-CP), a centralized controller, a topology function, a route function, a resource function, or some combination thereof.

12. A method of wireless communication at a central unit (CU), comprising:
identifying a relay node is connected to a first parent node via a first mobile terminal function of the relay node;
identifying the relay node is connected to a second parent node via a second mobile terminal function of the relay node different from the first mobile terminal function; and
transmitting a backhaul link configuration for the second mobile terminal function based at least in part on the identified relay node connections.

13. The method of claim 12, further comprising:
receiving backhaul information from the first mobile terminal function of the relay node via the first parent node, from the second mobile terminal function of the relay node via the second parent node, or both, based at least in part on the transmitted backhaul link configuration.

14. The method of claim 12, further comprising:
transmitting a network management function identifier to the relay node via the first parent node; and
transmitting the management function identifier to the relay node via the second parent node.

15. The method of claim 12, wherein identifying the relay node is connected to the second parent node via the second mobile terminal function of the relay node comprises:
receiving an identifier of the relay node from the first parent node; and
receiving the identifier of the relay node from the second parent node, wherein the identification that the relay node is connected to the second parent node via the second mobile terminal function of the relay node is based at least in part on the identifier of the relay node from the second parent node being the same as the identifier of the relay node from the first parent node.

16. The method of claim 12, further comprising:
transmitting a measurement configuration for the second mobile terminal function to the relay node, wherein the measurement configuration comprises an identifier of the second parent node, policy information for relay node selection of the second parent node, or some combination thereof.

17. The method of claim 12, wherein the backhaul link configuration for the second mobile terminal function is transmitted in a container of a radio resource control (RRC) message to the first mobile terminal function.

18. The method of claim 12, wherein the backhaul link configuration for the second mobile terminal function is transmitted in F1 application protocol (F1-AP) signaling.

19. A method for wireless communication at a relay node, comprising:
transmitting, using a first mobile terminal function of the relay node, a measurement report to a network management function via a first backhaul link to a first parent node, wherein the measurement report comprises a measurement of a second parent node transmission;
receiving, via the first backhaul link using the first mobile terminal function of the relay node, a backhaul link configuration for a second mobile terminal function based at least in part on the transmitted measurement report; and
establishing a second backhaul link between the second mobile terminal function of the relay node and the second parent node based at least in part on the received backhaul link configuration.

20. The method of claim 19, further comprising:

receiving a routing configuration for the first backhaul link and the second backhaul link, wherein the routing configuration comprises route utilization information, link utilization information, resource allocation information, or some combination thereof.

21. The method of claim 19, further comprising:

transmitting, via the first backhaul link using the first mobile terminal function, a capability report to the network management function;

receiving, via the first backhaul link using the first mobile terminal function of the relay node, a measurement configuration for the second mobile terminal function of the relay node based at least in part on the transmitted capability report; and performing, using the second mobile terminal function of the relay node, measurements of the second parent node transmission based at least in part on the measurement configuration, wherein the transmitted measurement report comprises the measurements.

22. The method of claim 21, wherein the capability report comprises an identifier of the second mobile terminal function, one or more radio access technologies (RATs) supported by the second mobile terminal function, one or more frequency bands supported by the second mobile terminal function, azimuth and elevation patterns supported by the second mobile terminal function, radio frequency (RF) capabilities of the second mobile terminal function, isolation between the first and second mobile terminal function, an identifier of the relay node, a list of supported mobile terminal functions, or some combination thereof.

23. The method of claim 21, wherein the measurement configuration includes an identifier of the second mobile terminal function, an identifier of the second parent node, or some combination thereof.

24. The method of claim 19, wherein the backhaul link configuration for the second mobile terminal function comprises an identifier of the second mobile terminal function of the relay node, an identifier of the second parent node, a route configuration parameter, or some combination thereof.

25. The method of claim 19, wherein the backhaul link configuration for the second mobile terminal function is received in a container of a radio resource control (RRC) message received by the first mobile terminal function or in F1 application protocol (F1-AP) signaling.

26. The method of claim 19, wherein the first parent node and the second parent node are associated with the network management function supported by a central unit (CU) and the network management function comprises a Next Generation Node B (gNB), a gNB-central unit (gNB-CU), a gNB-CU-control plane (gNB-CU-CP), an evolved Node B (eNB), an eNB-central unit (eNB-CU), an eNB-CU-control plane (eNB-CU-CP), a centralized controller, a topology function, a route function, a resource function, or some combination thereof.

27. A method for wireless communication, comprising:

receiving, by a network management function via a first backhaul link, a measurement report from a first mobile terminal function of a relay node, wherein the measurement report comprises a measurement of a second parent node transmission;

identifying a backhaul link configuration for the second mobile terminal function based at least in part on the received measurement report; and transmitting, by the network management function via the first backhaul link, the identified backhaul link configuration for the second mobile terminal function to the first mobile terminal function of the relay node.

28. The method of claim 27, further comprising:

transmitting, by the network management function, a routing configuration for a second backhaul link, between the second mobile terminal function of the relay node and the first parent node, and a first backhaul link, between the first mobile terminal function of the relay node and the first parent node, wherein the routing configuration comprises route utilization information, link utilization information, resource allocation information, or some combination thereof.

29. The method of claim 27, further comprising:

receiving, by the network management function via the first backhaul link, a capability report from the first mobile terminal function of the relay node, wherein the capability report comprises capability information for the second mobile terminal function of the relay node;

identifying a measurement configuration for the second mobile terminal function of the relay node based at least in part on the received capability report; and transmitting, by the network management function via the first backhaul link, the identified measurement configuration to the first mobile terminal function, wherein the measurement report is received based at least in part on the transmitted measurement configuration.

30. The method of claim 29, wherein the capability report comprises an identifier of the second mobile terminal function, one or more radio access technologies (RATs) supported by the second mobile terminal function, one or more frequency bands supported by the second mobile terminal function, azimuth and elevation patterns supported by the second mobile terminal function, radio frequency (RF) capabilities of the second mobile terminal function, isolation between the first mobile terminal function and the second mobile terminal function, an identifier of the relay node, a list of supported mobile terminal functions, or some combination thereof.

* * * * *